(12) United States Patent
Nobori et al.

(10) Patent No.: US 8,640,051 B2
(45) Date of Patent: Jan. 28, 2014

(54) INFORMATION PROCESSING UNIT, CONTENT PROVIDING SERVER, INFORMATION PROCESSING METHOD AND CONTENT PROVIDING METHOD

(75) Inventors: Fujio Nobori, Kanagawa (JP); Nariaki Satoh, Kanagawa (JP); Mamoru Tokashiki, Tokyo (JP)

(73) Assignee: Sony Corporation, Tokyo (JP)

( * ) Notice: Subject to any disclaimer, the term of this patent is extended or adjusted under 35 U.S.C. 154(b) by 913 days.

(21) Appl. No.: 12/245,115

(22) Filed: Oct. 3, 2008

(65) Prior Publication Data

US 2009/0106700 A1 Apr. 23, 2009

(30) Foreign Application Priority Data

Oct. 5, 2007 (JP) ................. P2007-262360

(51) Int. Cl.
*G06F 3/048* (2013.01)
(52) U.S. Cl.
USPC ........... 715/838; 715/854; 715/727; 715/765; 715/781; 715/853
(58) Field of Classification Search
USPC .......... 715/838, 854, 727, 765, 781, 841, 855
See application file for complete search history.

(56) References Cited

U.S. PATENT DOCUMENTS

| | | | |
|---|---|---|---|
| 6,983,426 B1 * | 1/2006 | Kobayashi et al. | 715/854 |
| 8,161,411 B2 * | 4/2012 | Robbin et al. | 715/854 |
| 2004/0210933 A1 * | 10/2004 | Dresti et al. | 725/40 |
| 2005/0049941 A1 * | 3/2005 | Kaplan | 705/27 |
| 2007/0094611 A1 * | 4/2007 | Sasaki | 715/804 |
| 2007/0244856 A1 * | 10/2007 | Plastina et al. | 707/3 |
| 2008/0276279 A1 * | 11/2008 | Gossweiler et al. | 725/46 |
| 2010/0235407 A1 * | 9/2010 | Nichols et al. | 707/805 |
| 2011/0035699 A1 * | 2/2011 | Robert et al. | 715/783 |

FOREIGN PATENT DOCUMENTS

| | | | | | |
|---|---|---|---|---|---|
| EP | 1096793 A2 | * | 5/2001 | | H04N 5/45 |
| JP | 2003-108473 | | * | 9/2001 | G06F 13/00 |
| JP | 2003-108473 | | | 4/2003 | |
| JP | 2006-295236 | | * | 4/2005 | G06F 3/048 |
| JP | 2006-295236 | | | 10/2006 | |

OTHER PUBLICATIONS

Kanaui et al; A Browsing System for a Database Using Visualization of User Preferences; © 2000; IEEE; pp. 277-282.*
Kang et al.; Visualization Methods for Personal Photo Collections: Browsing and Searching in the PhotoFinder; © 2000; IEEE; pp. 1539-1542.*

(Continued)

*Primary Examiner* — Linh K Pham
(74) *Attorney, Agent, or Firm* — Finnegan, Henderson, Farabow, Garrett & Dunner, L.L.P.

(57) ABSTRACT

An information processing unit according to the present invention includes: a content information acquiring portion which acquires meta data containing a thumbnail of a content corresponding to the content data and information indicating presence/absence of a preview of the content and the content data; a display control portion which displays a list of the content thumbnails on a display portion; and an operation detecting portion which detects the operation of a position specifying object for specifying the content to be reproduced from the displayed thumbnail, wherein if the position specifying object stays in the thumbnail corresponding to the content whose preview is present in a predetermined time interval, the content information acquiring portion acquires content data relating to the preview, and the display control portion automatically reproduces the acquired content data relating to the preview.

16 Claims, 21 Drawing Sheets

(56) References Cited

OTHER PUBLICATIONS

Kohtake et al; StateSnap: A Snapshot-based Interface for State-Reproductable Operation of Networked Appliances; © IEEE; 11 pages.*

Park et al; Selecting Useful Images from the Web for Mobile Services; © 2006 ; IEEE; 5 pages.*

Japanese Office Action in corresponding Japanese Patent Application 2007-262360 dated Sep. 1, 2009 (3 pages).

* cited by examiner

FIG.15

| TITLE 601 | DESCRIPTION 603 | RATING 605 | EVALUATION 607 | EPISODE No. 609 | TIME 611 | CATEGORY 613 | THUMBNAIL URL 615 | TRAILER PRESENCE/ABSENCE 617 |
|---|---|---|---|---|---|---|---|---|
| A | ○○○○ | — | 3 | 1/3 | 0h57m45s | DRAMA | ○○○×× × | 1 |
| A | ×××× | — | 5 | 2/3 | 0h55m40s | DRAMA | ○○○△△△ | 1 |
| A | △△△△ | — | 2 | 3/3 | 0h56m18s | DRAMA | ○○○□□□ | 1 |
| B | ○×○× | PG18 | 5 | — | 2h19m48s | MOVIE | △△△×× × | 1 |
| C | ×△×△ | — | 0 | — | 0h55m38s | FAMILY | — | 0 |
| ... | ... | ... | ... | ... | ... | ... | ... | ... |

FIG.16

| USER ID 701 | CONNECTING STATE 703 | ENJOYED CONTENT 705 | FRIEND USER ID 707 | FRIEND USER CONNECTING STATE 709 | CONTENT ENJOYED BY FRIEND USER 711 |
|---|---|---|---|---|---|
| U1 | ON LINE | 111 | U2 | ON LINE | 202 |
| U2 | ON LINE | 202 | U4 | OFF LINE | None |
| U3 | OFF LINE | None | U1 | ON LINE | 111 |
| U4 | OFF LINE | None | U5 | OFF LINE | None |
|  |  |  | U1 | ON LINE | 111 |
| ... | ... | ... | ... | ... | ... |

INFORMATION PROCESSING UNIT, CONTENT PROVIDING SERVER, INFORMATION PROCESSING METHOD AND CONTENT PROVIDING METHOD

CROSS-REFERENCE TO RELATED APPLICATION

The present invention contains subject matter related to Japanese Patent Application JP2007-262360 filed in the Japan Patent Office on Oct. 5, 2007, the entire contents of which being incorporated herein by reference.

BACKGROUND OF THE INVENTION

1. Field of the Invention

The present invention relates to an information processing unit, a content providing server, an information processing method and a content providing method.

2. Description of the Related Art

With progress of information communication technology in recent years, a large volume content data can be received to watch and listen to contents in AV appliances such as TV, DVD recorder, Blu-ray recorder, and portable terminals such as portable phone and personal digital assistant (PDA).

According to the system described in Japanese Patent Application Laid-Open No. 2003-108473 described below, a home server is provided so as to send a request for content data from a portable terminal to that home server and a content data suitable for the portable terminal is obtained to allow the content to be watched or listened to through the portable terminal comfortably.

SUMMARY OF THE INVENTION

When selecting a content in the aforementioned system, a content desired to be watched or listened to is selected from a text basis content list in many cases. Thus, user needs to select the content only by referring to the text data, which provides inconvenience in selection of the content.

Accordingly the present invention has been achieved in views of these issues and it is desirable to provide a novel and improved information processing unit, content providing server, information providing method and content providing method, which allows the content of a content to be grasped easily and that content to be selected easily.

According to an embodiment of the present invention, there is provided an information processing unit which acquires content data from a content providing server and is capable of reproducing the acquired content data, including: a content information acquiring portion which acquires meta data containing a thumbnail of a content corresponding to the content data and information indicating presence/absence of a preview of the content and the content data; a display control portion which displays a list of the content thumbnails on a display portion; and an operation detecting portion which detects the operation of a position specifying object for specifying the content to be reproduced from the displayed thumbnail, wherein if the position specifying object stays in the thumbnail corresponding to the content whose preview is present in a predetermined time interval, the content information acquiring portion acquires content data relating to the preview and the display control portion automatically reproduces the acquired content data relating to the preview instead of the thumbnail where the position specifying object stays, in a display region in which the thumbnail where the position specifying object stays is displayed.

With such a structure, the content information acquiring portion acquires the meta data containing a thumbnail of a content corresponding to the content data and information indicating presence/absence of a preview of the content from the content providing server. The display control portion displays a list of the thumbnails of the acquired contents on the display portion. The operation detecting portion detects an operation of the position specifying object which selects the content to be reproduced from the displayed thumbnail. In the information processing unit according to the present invention, when the position specifying object stays in a thumbnail corresponding to the content whose preview exists in a predetermined time interval, the content information acquiring portion acquires the content data relating to the preview and the display control portion automatically reproduces the acquired content data relating to the preview instead of the thumbnail where the position specifying object stays in the display region where the thumbnail in which the position specifying object stays is displayed. Consequently, user can grasp the content of a content easily and select the content easily.

If the position specifying object stays in the thumbnail, the display control portion may display meta data of the thumbnail where the position specifying object stays, such that it does not overlap a representation of the thumbnail where the position specifying object stays.

If the position specifying object stays in the thumbnail, the content information acquiring portion may acquire presence/absence of other information processing unit which currently watches or listens to a content corresponding to the thumbnail from the content providing server, and the display control portion may display the information about the other information processing unit such that it does not overlap the representation of the thumbnail where the position specifying object stays.

If the position specifying object stays in the thumbnail, the content information acquiring portion may acquire an evaluation of a content corresponding to the thumbnail applied by other information processing unit from the content providing server, and the display control portion may display the evaluation of the content such that it does not overlap the representation of the thumbnail where the position specifying object stays.

According to another embodiment of the present invention, there is provided a content providing server for providing content information to an information processing unit including: a content information acquiring portion for acquiring meta data containing a thumbnail of a content corresponding to content data and information indicating presence/absence of a preview of the content and the content data; a display control portion for displaying a list of the thumbnails of the contents on a display portion; and an operation detecting portion for detecting an operation of a position specifying object which selects the content to be reproduced from the displayed thumbnail, in which when the position specifying object stays in the thumbnail corresponding to the content whose preview exists, the content information acquiring portion acquires the content data relating to the preview, and the display control portion automatically reproduces content data relating to the acquired preview instead of the thumbnail where the position specifying object stays, in the display region in which the thumbnail where the position specifying object stays is displayed, the content providing server further including: a content information memory portion which memorizes the content data and the meta data containing the thumbnail of a content corresponding to the content data and information about presence/absence of a preview of the content in correlation with each other; and a content information distribution portion for distributing at least any one of the content data and the meta data containing the thumbnail of the content corresponding to the content data and information indicating presence/absence of a preview of the content.

The content information memory portion may memorize the provision history of the content recorded in the content information memory portion in correlation with the content.

The content information memory portion may memorize the evaluation on the content applied to the content recorded in the content information memory portion in correlation with the content.

The content providing server may further include a connecting state control portion for controlling the connecting state of the plural information processing units connected to the content providing server and a communication control portion for controlling the bidirectional communication implemented between the connecting state control portion and the plural information processing units.

According to still another embodiment of the present invention, there is provided an information processing method including the steps of: acquiring content information including meta data containing a thumbnail of a content corresponding to content data and information indicating presence/absence of a preview of the content and the content data; displaying a list of the thumbnails of the contents on a display portion; and detecting an operation of a position specifying object which selects the content to be reproduced from the displayed thumbnail, wherein in the operation detecting step, when the position specifying object stays in the thumbnail corresponding to the content whose preview exists in a predetermined time interval, the position specifying object acquires the content data relating to the preview, and automatically reproduces the acquired content data relating to the preview instead of the thumbnail where the position specifying object stays, in the display region in which the thumbnail where the position specifying object stays is displayed.

According to a further embodiment of the present invention, there is provided a content providing method including: a content information acquiring portion for acquiring meta data containing a thumbnail of a content corresponding to content data and information indicating presence/absence of a preview of the content and the content data from an external device; a display control portion for displaying a list of the thumbnails of the contents on a display portion; and an operation detecting portion for detecting an operation of a position specifying object which selects the content to be reproduced from the displayed thumbnail, in which when the position specifying object stays in the thumbnail corresponding to the content whose preview exists in a predetermined time interval, the content information acquiring portion acquires the content data relating to the preview, and the display control portion automatically reproduces the content data relating to the acquired preview instead of the thumbnail where the position specifying object stays, in the display region in which the thumbnail where the position specifying object stays is displayed, the content providing method further including the steps of: distributing the meta data containing the thumbnail of a content corresponding to the content data and information indicating presence/absence of a preview of the content; and distributing the content data relating to the preview corresponding to the content to the information processing unit corresponding to a request from the information processing unit.

According to a further embodiment of the present invention, there is provided a program for making a computer function as an information processing unit which acquires content data from a content providing server and is capable of reproducing the acquired content data, including: a content information acquiring function which acquires meta data containing a thumbnail of a content corresponding to the content data and information indicating presence/absence of a preview of the content and the content data; a display control function which displays a list of the content thumbnails on a display portion; and an operation detecting function which detects the operation of a position specifying object for selecting the content to be reproduced from the displayed thumbnail.

With such a configuration, the computer program is stored in the memory portion possessed by the computer and read into a CPU possessed by the computer and executed, so as to make the computer function as the information processing unit. Further, a computer readable recording medium in which the computer program is recorded can be provided. The recording medium includes, for example, a magnetic disk, optical disk, photomagnetic disk, and flash memory. The aforementioned computer program may be distributed through, for example, network without use of any recording medium.

According to a still further embodiment of the present invention, there is provided a program for making a computer function as a content providing server for providing external devices with the content information, including: a content information memory function which memorizes the content data and the meta data containing the thumbnail of a content corresponding to the content data and information about presence/absence of a preview of the content in correlation with each other; and a content information distribution function which distributes at least any one of the content data and the meta data containing the thumbnail of the content corresponding to the content data and information indicating presence/absence of a preview of the content.

With such a configuration, the computer program is stored in the memory portion possessed by the computer and read into a CPU possessed by the computer and executed, so as to make the computer function as the content providing server. Further, a computer readable recording medium in which the computer program is recorded can be provided. The recording medium includes, for example, a magnetic disk, optical disk, photomagnetic disk, and flash memory. The aforementioned computer program may be distributed through, for example, network without use of any recording medium.

According to the embodiments of the present invention described above, a list of the thumbnails corresponding to the contents can be displayed and when the position specifying object for use in selecting a content stays on a thumbnail in a predetermined time interval, the content of the content can be grasped easily and the content can be selected easily in order to automatically reproduce the preview of the content in which the position specifying object stays.

BRIEF DESCRIPTION OF THE DRAWINGS

FIG. 15 is an explanatory diagram for explaining an example of meta data which a content information distribution portion according to the embodiment sends;

FIG. 16 is an explanatory diagram for explaining connection control information generated by a connecting state control portion according to the embodiment;

DETAILED DESCRIPTION OF THE PREFERRED EMBODIMENTS

Figure 1:
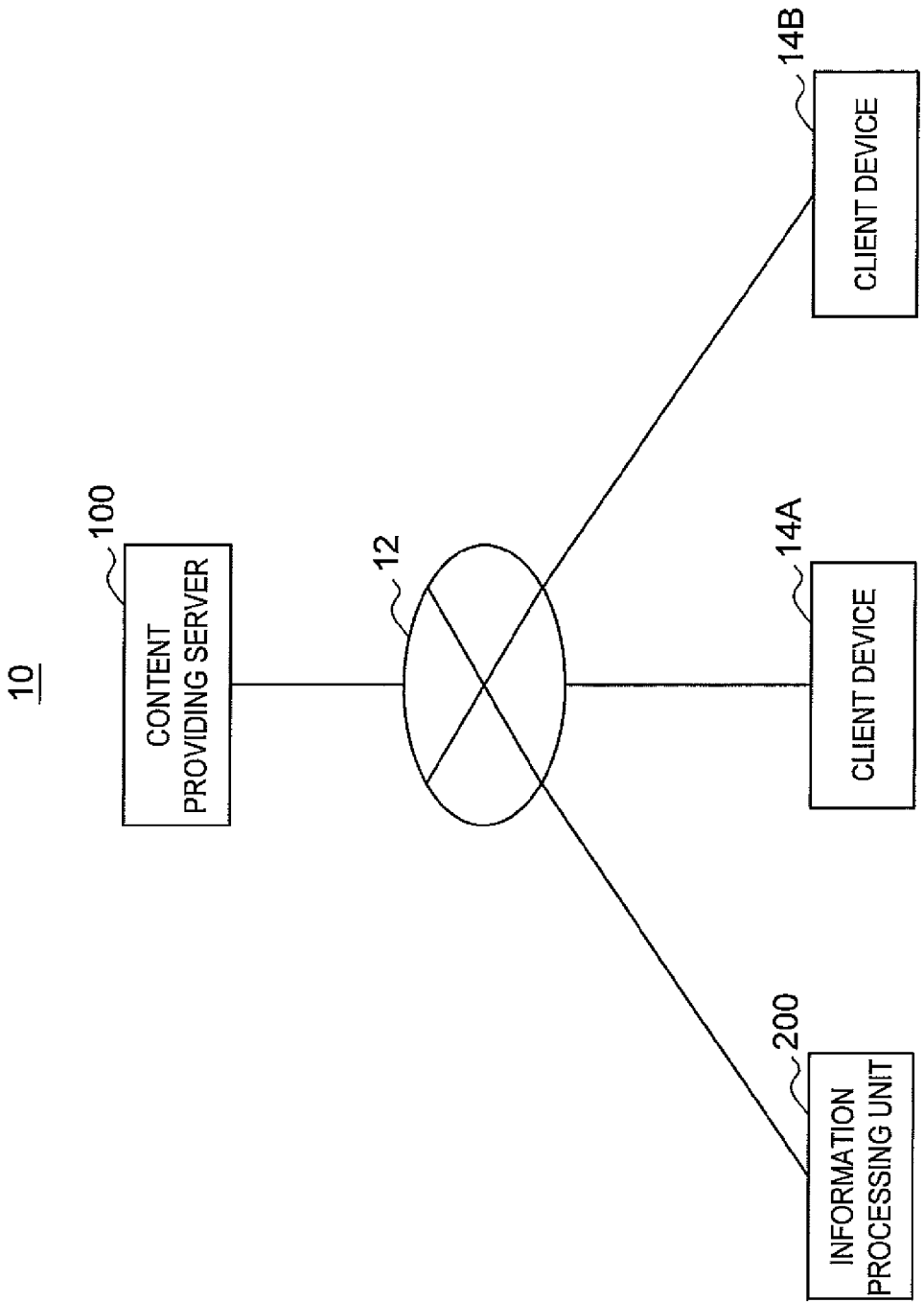
FIG. 1 is an explanatory diagram for explaining a content providing system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

About Content Providing System According to this Embodiment

The content providing system according to this embodiment will be described in detail with reference to FIG. 1. FIG. 1 is an explanatory diagram for explaining the content providing system according to this embodiment.

As shown in FIG. 1, in the content providing system 10 according to this embodiment, a content providing server 100 and an information processing unit 200 according to this embodiment are connected through a communication network 12. Further, plural client devices 14A, 14B are connected to the communication network 12.

The communication network 12 is a communication network for connecting the content providing server 100, the information processing unit 200 and the plural client devices 14 to be able to carry out bidirectional communication or single-direction communication. This communication network is constituted of, for example, public network such as Internet, telephone network, satellite network, broadcast network, and leased line network such as wide area network (WAN), local area network (LAN), Internet protocol-virtual private network (IP-VPN), Ethernet (registered trade mark), wireless LAN, while both wired and wireless are used.

The content providing server 100 controls contents such as video content, music content, photo content and provides content data and content meta data corresponding to a content controlled by the content providing server 100, in response to a request from the information processing unit 200 or the client device 14. The content providing server 100 may be a digital media server (DMS) based on DLNA guide line. In the meantime, the content providing server 100 will be described in detail below.

The information processing unit 200 is connected to the content providing server 100 through the communication network 12 so as to receive a list of contents controlled by the server 100 and meta data of the content from the content providing server 100 and display the list of the reproducible contents. The information processing unit 200 requests the content providing server 100 to provide content data corresponding to a specification of user of the information processing unit 200 and reproduce the acquired content data. The information processing unit 200 can communicate with the plural client devices 14 described later through bidirectional communication such as chat. Further, the information processing unit 200 may be DMS based on DLNA guideline or a digital media player (DMP). In the meantime, the information processing unit 200 will be described in detail below.

The client device 14 is connected to the content providing server 100 through the communication network 12 and can reproduce a content acquired from the content providing server 100. The client device 14 can carry out bidirectional communication such as chat between the other client device 14 and the information processing unit 200 through the communication network 12 and the content providing server 100.

In the meantime, the information processing unit 200 and the client device 14 are not limited to a computer unit (regardless of whether the notebook type or desktop type) such as a personal computer (PC), and may be a TV receiver, DVD/HDD recorder, Blu-ray recorder, portable phone, PDA, digital camera and the like. Any device having communication function via network can be constituted of, for example, home use game machine, information household appliance such as digital video camera, TV broadcasting tuner or decoder. The information processing unit 200 and the client device 14 may be a portable device which a subscriber can carry, for example, a portable game machine, PHS, portable video/sound player and the like.

<Example of Application for Use in Information Processing Unit According to this Embodiment>

Subsequently, an example of the application for use in an information processing unit 200 of this embodiment will be described with reference to FIG. 2-FIG. 13. FIG. 2-FIG. 13 are explanatory diagrams for explaining an example of an application for use in the information processing unit 200 according to this embodiment.

Figure 2:
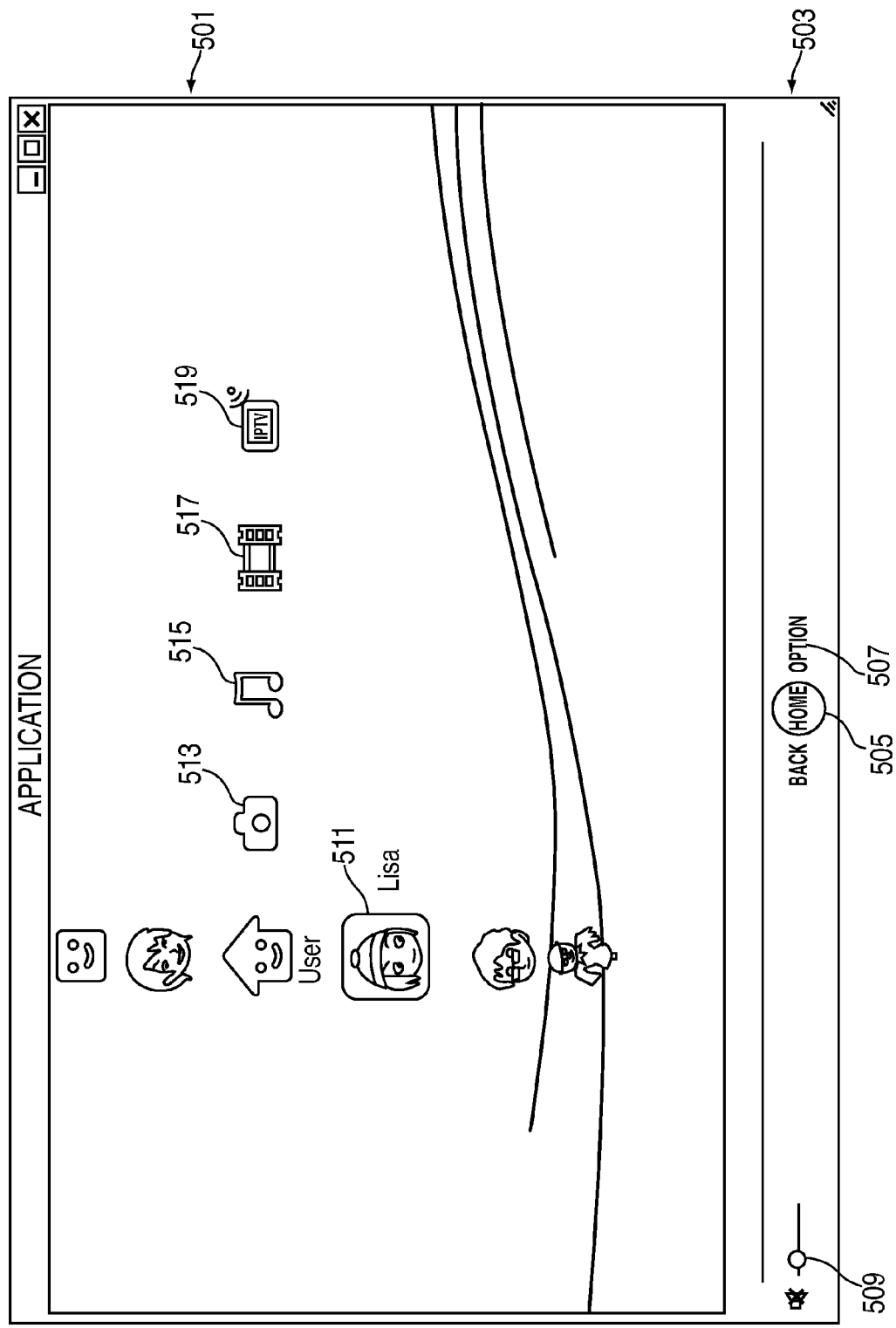
FIG. 2 is an explanatory diagram for explaining an example of an application for use in an information processing unit according to the embodiment.

In the information processing unit 200 according to this embodiment, if an application which allows the content to be watched/listened is started by user's operation, a screen shown in FIG. 2 is displayed as an initial screen. The initial screen includes an information display region 501 in which various kinds of information is displayed, and an operation object display region 503 in which a "HOME" icon 505 for returning to the initial screen, an "OPTION" icon 507 for moving to an option setting screen, a sound volume setting button 509 and other objects are disposed.

User of the information processing unit 200 selects various kinds of contents which user desires to watch or listen to from an user selection icon 511 displayed in the information display region 501 after the user selects an icon corresponding to a user ID for use in watching or listening. Referring to FIG. 2, an icon 513 for reviewing photo content such as still image, an icon 515 for reproducing music content, an icon 517 for watching or listening to a movie content such as animation, an icon 519 for watching or listening to a distribution type content such as IPTV and video on demand (VoD) are disposed as an example of a content which can be watched or listened to. User can enjoy a desired content by selecting these icons.

Figure 3:
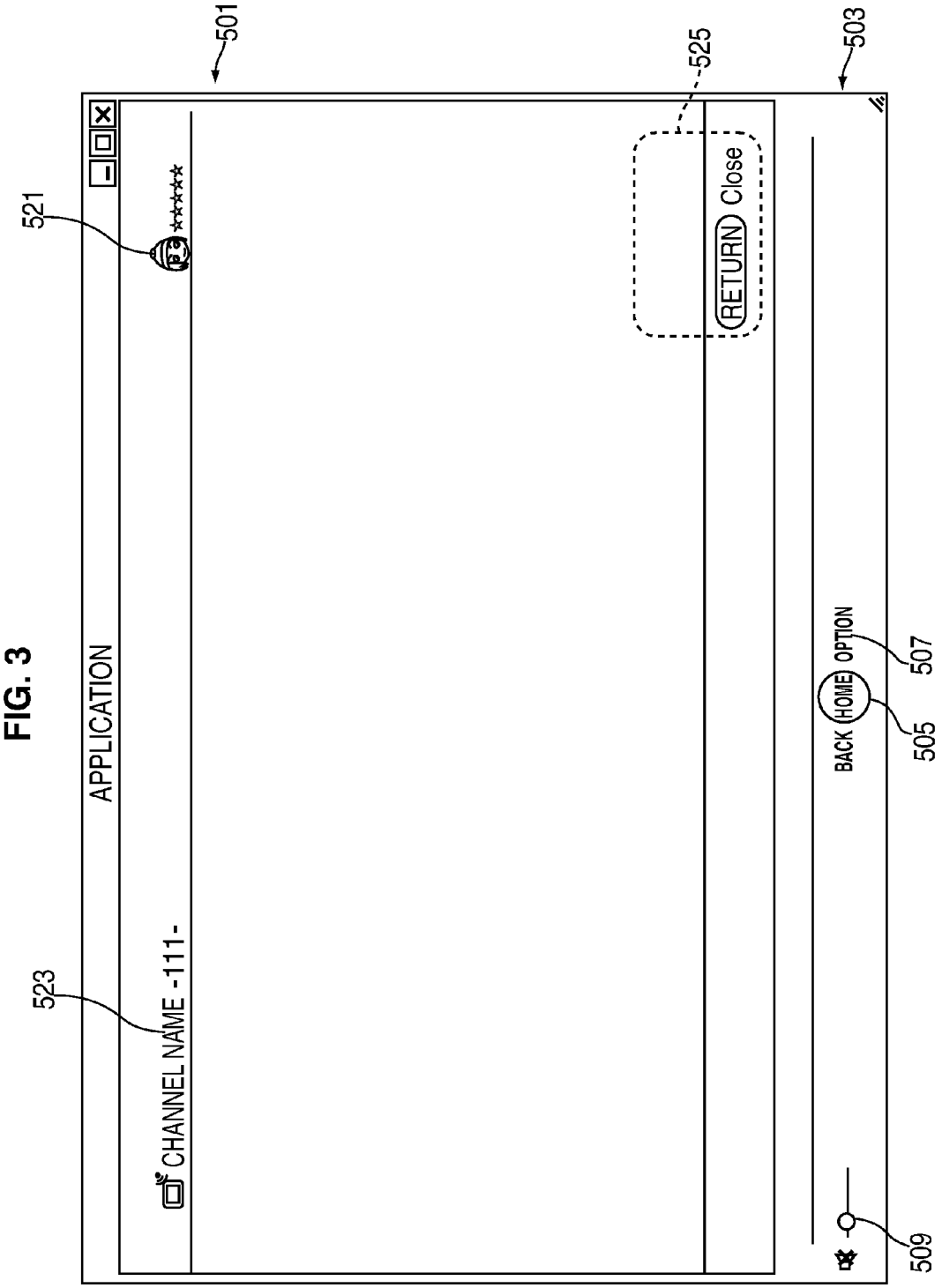
FIG. 3 is an explanatory diagram for explaining the example of the application for use in the information processing unit according to the embodiment.

If user selects the icon 519 for watching or listening to a content such as IPTV and after that, determines a desired content for watching/listening, a screen shown in FIG. 3 is displayed on the display portion of the information processing unit 200. In the display screen when any content is watched or listened to, as shown in FIG. 3, user's icon 521 selected on the initial screen and information 523 for specifying a content being watched or listened to such as the name of the content are displayed in the upper portion of the information display region 501, and the content of the content being watched or listened to currently are displayed in other portion of the information display region 501. In an operation object display region 503, a "RETURN" icon for returning to a previous screen, a "CLOSE" icon for closing the screen and an operation object 525 for executing a predetermined operation on the information display region 501 are displayed.

Figure 4:
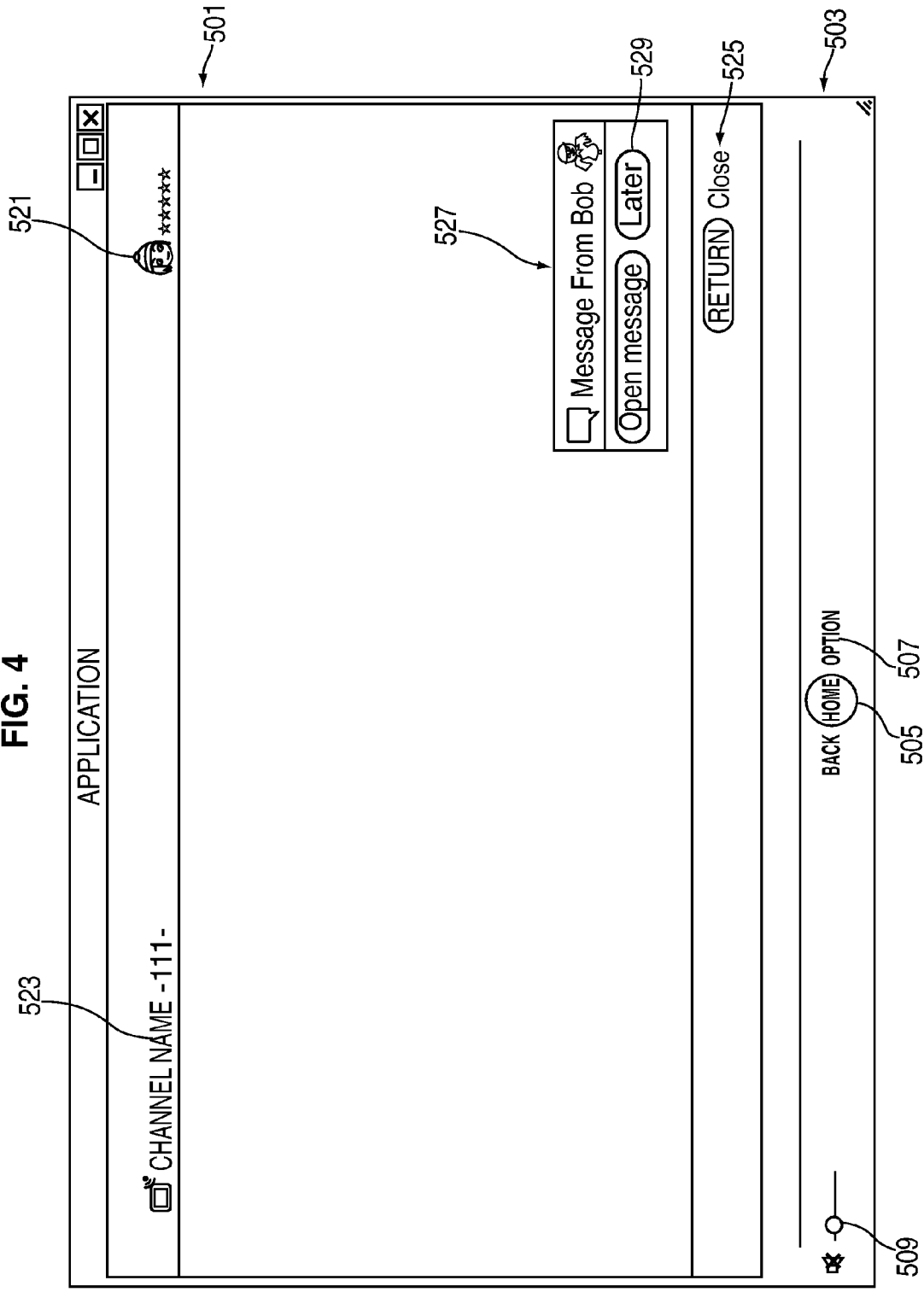
FIG. 4 is an explanatory diagram for explaining the example of the application for use in the information processing unit according to the embodiment.

When any content is being watched or listened to, a message is sometimes sent from user of the client device 14 connected to the communication network 12. In that case, message reception information 527 which says that a message is received is displayed in part of the information display region 501 as shown in FIG. 4 and an object 529 for selecting which the message is to be confirmed immediately or later is displayed. User of the information processing unit 200 can select whether or not the received message is to be displayed by selecting any one of the objects 529.

Figure 5:
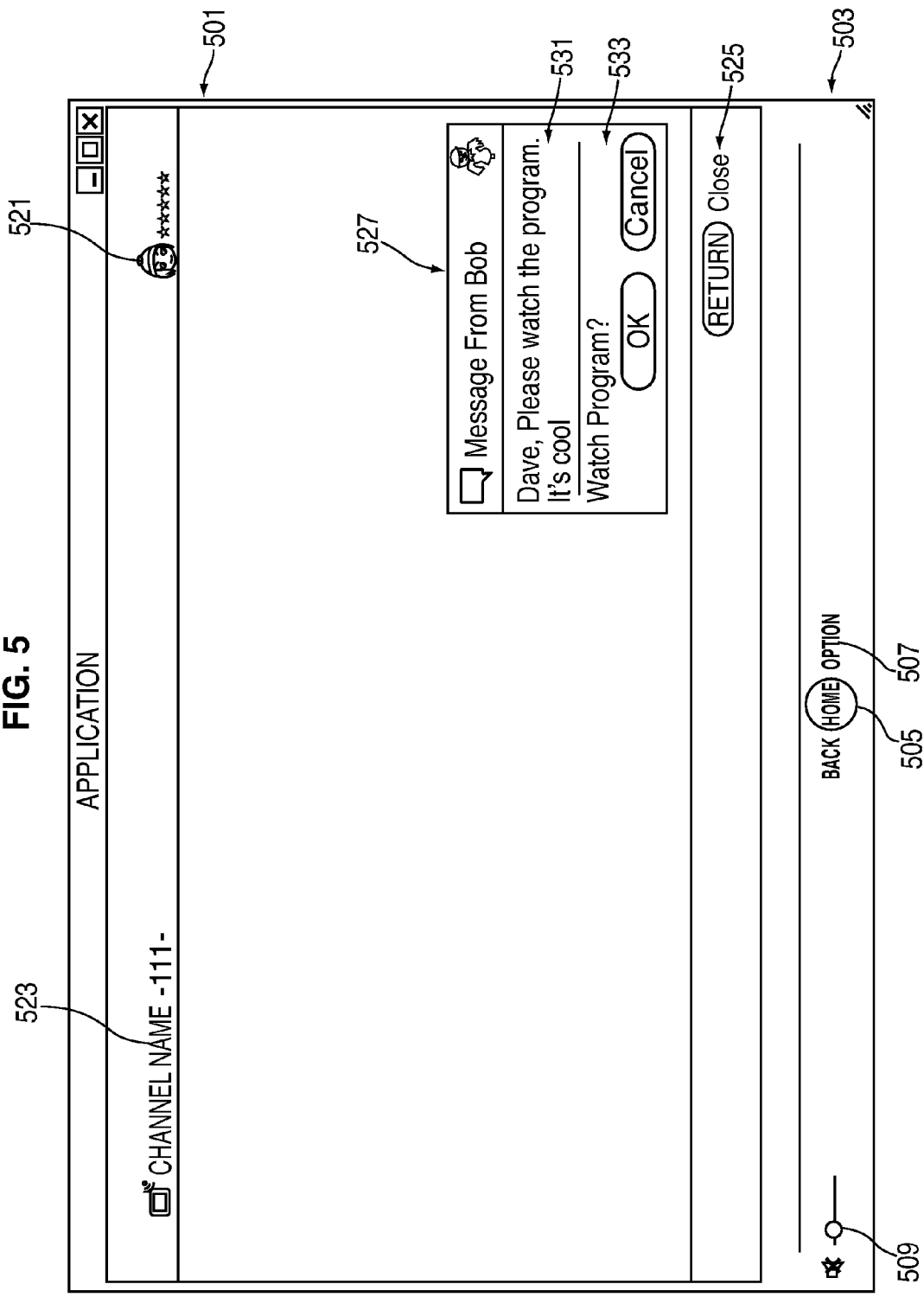
FIG. 5 is an explanatory diagram for explaining the example of the application for use in the information processing unit according to the embodiment.

If display of the received message is selected, the received message is displayed in the message display region 531 as shown in FIG. 5. If the received message has information for recommending watching or listening of a content which a sender of that message is watching or listening, a message for confirming whether or not the content which the sender of that message is watching or listening to and an object for executing a switch operation are displayed in a content switching operation object display region 533.

The message display region 531 and content switching operation object display region 533 are disposed within the information display region 501 so that its portion concealing the content of the content displayed in the information display region 501 is as small as possible.

Figure 6:
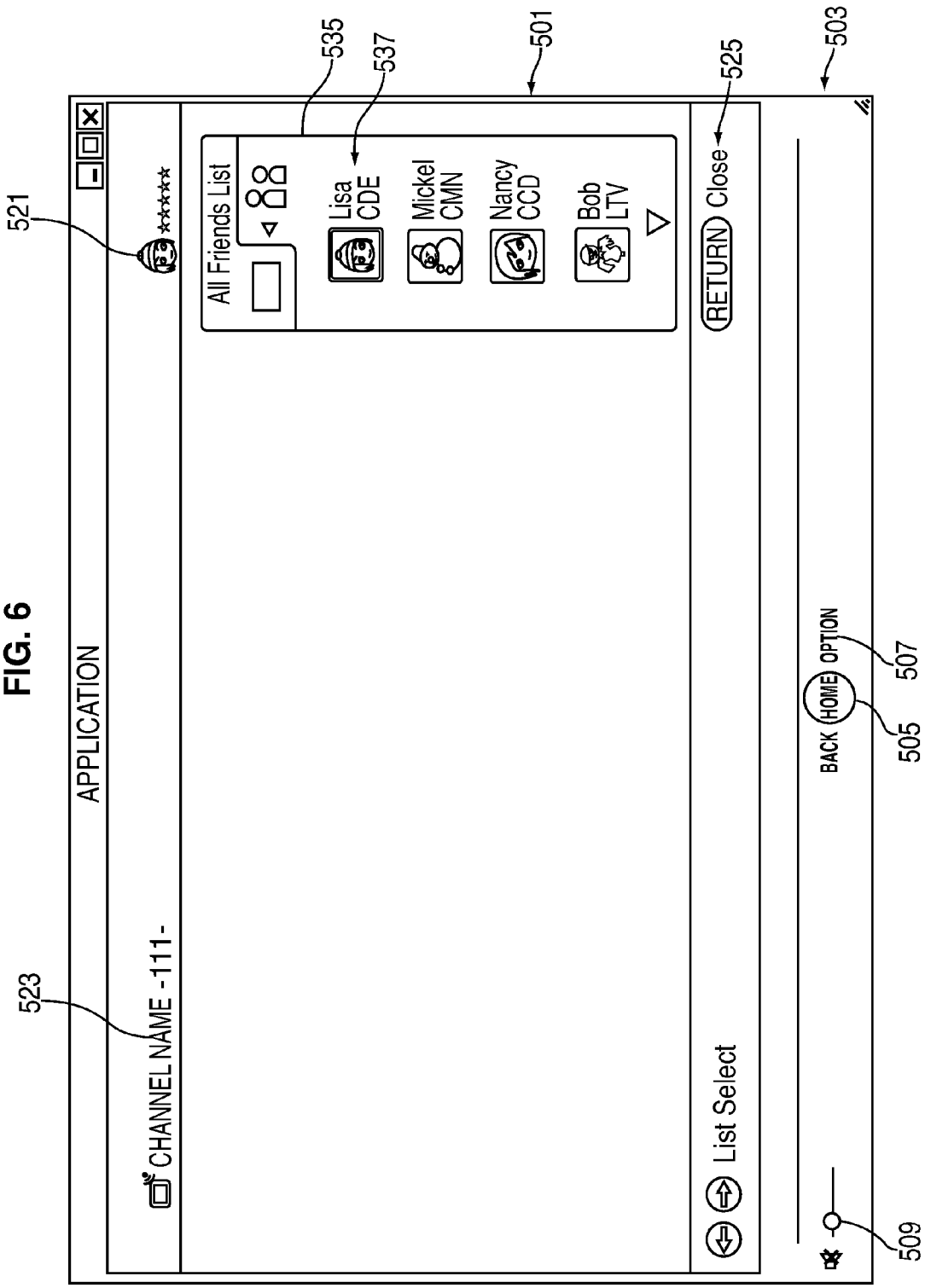
FIG. 6 is an explanatory diagram for explaining the example of the application for use in the information processing unit according to the embodiment.

In the application according to this embodiment, by setting information (for example, friend's user ID, address of client device used by the friend, and the like) about friends of the user of the information processing unit 200 preliminarily, whether or not the friend is connected to the content providing server 100 can be determined. More specifically, as shown in FIG. 6, the information display region 501 is provided with a registered ID connecting state display region 535 so as to reduce a portion concealing the content of a content being watched or listened, and objects 537 expressing preliminarily registered friends and friends' ID names are displayed such that they are correlated in this registered ID connecting state display region 535 as "All Friends List". At this time, by changing an object (for example, avatar or the like) about user connected to the content providing server 100 and the display method of the object about not-connected user, user of an information processing unit 200 can grasp friend's connecting state. For example, by changing the color and the size of the line which surrounds the object 537, changing the transparency of the object 537 or blinking the object 537, user of the information processing unit 200 can grasp the connecting state of friend user visually.

Figure 7:
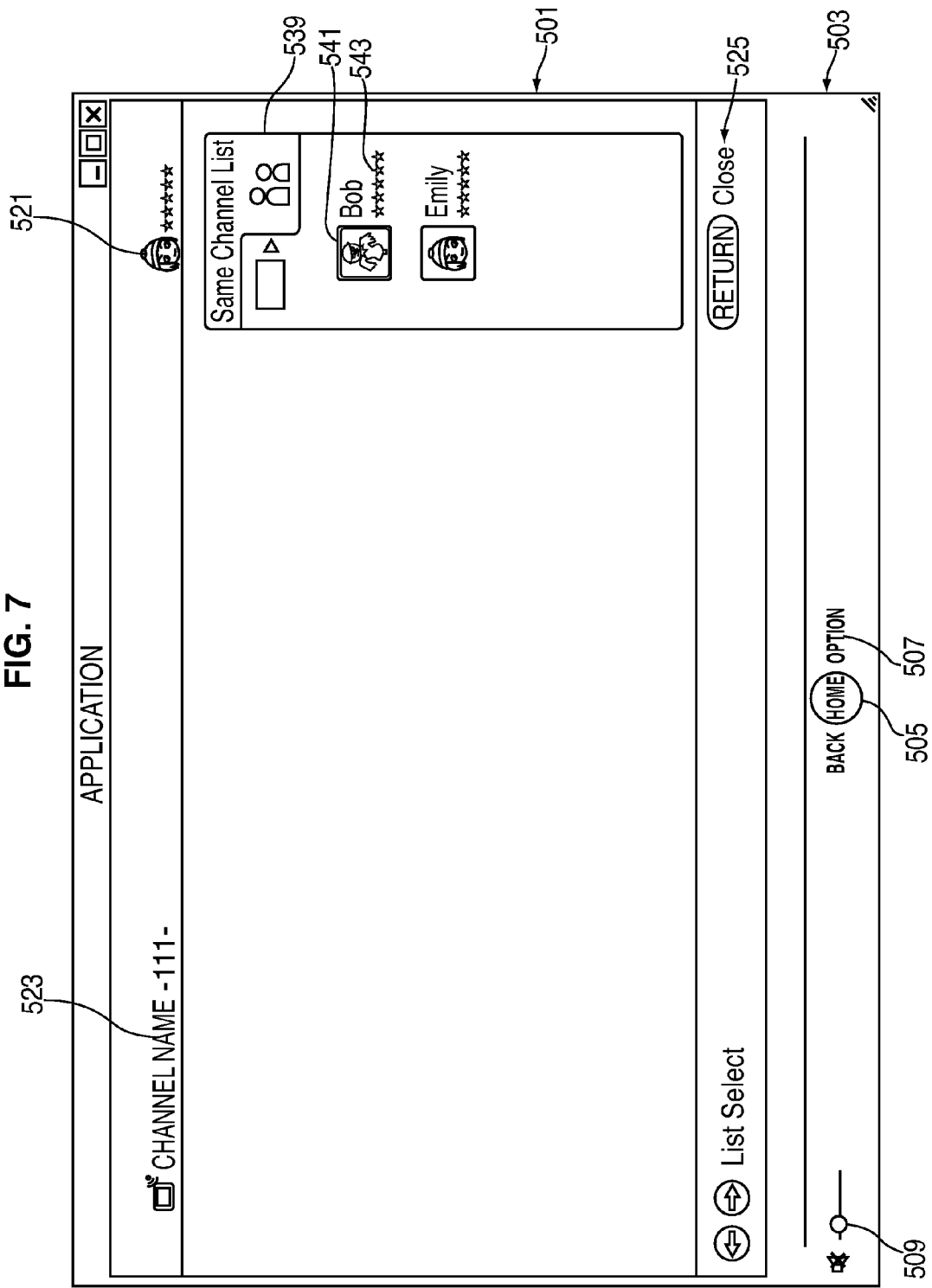
FIG. 7 is an explanatory diagram for explaining the example of the application for use in the information processing unit according to the embodiment.
Figure 8:
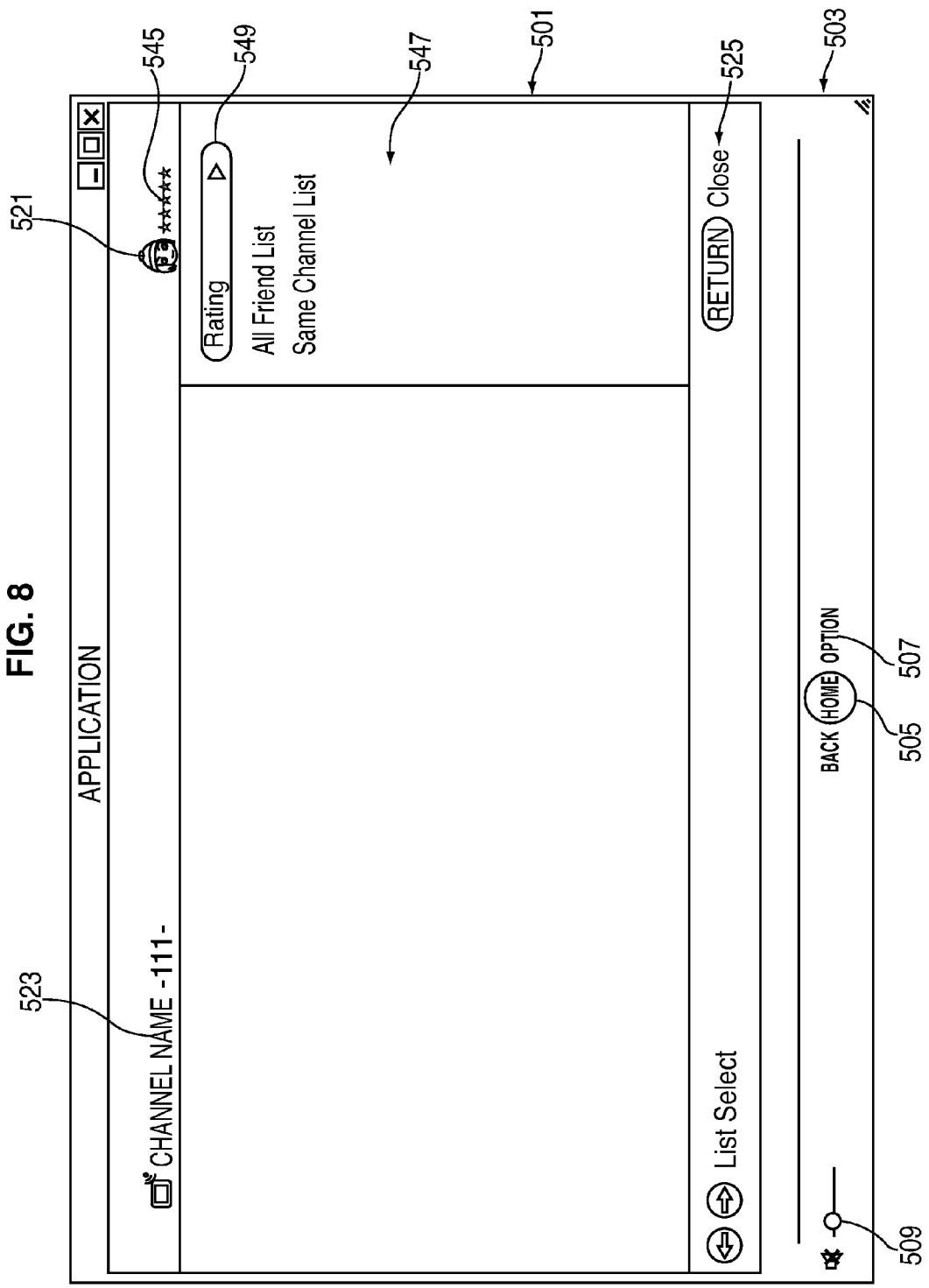
FIG. 8 is an explanatory diagram for explaining the example of the application for use in the information processing unit according to the embodiment.

In the application according to this embodiment, a list of other users who watch or listen to the same content as the content which the user of the information processing unit 200 watches or listens to, can be also displayed. As shown in FIG. 7, a same content viewer display region 539 is provided in the information display region 501 so that a portion concealing the content of a content being watched or listened to is minimized and an object (avatar) 541 of user who watches or listens to the same content is displayed in correlation with user name as "Same Channel List" in the same content viewer display region 539. Further, an evaluation 543 which is performed on any content which the user is watching or listening to is displayed in the object 541 of the user. Although in the example shown in FIG. 7, the evaluation of user is expressed as the number of stars, this embodiment is not limited to the example shown in the same Figure but the evaluation may be expressed in count or using predetermined keywords such as "good", "normal" and "bad".

The evaluation on any content being watched or listened to can be performed by the user of the information processing unit 200 also. The evaluation 545 to a content being watched or listened to is expressed as the number of starts such that it adjoins the icon (avatar) 521 indicating user. To change this evaluation, for example, the "OPTION" icon 507 displayed in the operation object display region 503 is selected and an option operation selecting region 547 is displayed in the information display region 501. Subsequently, the evaluation is carried out by selecting an object ("Rating" icon) 549 for evaluation from the option operation information displayed in the option operation selecting region 547.

Figure 9:
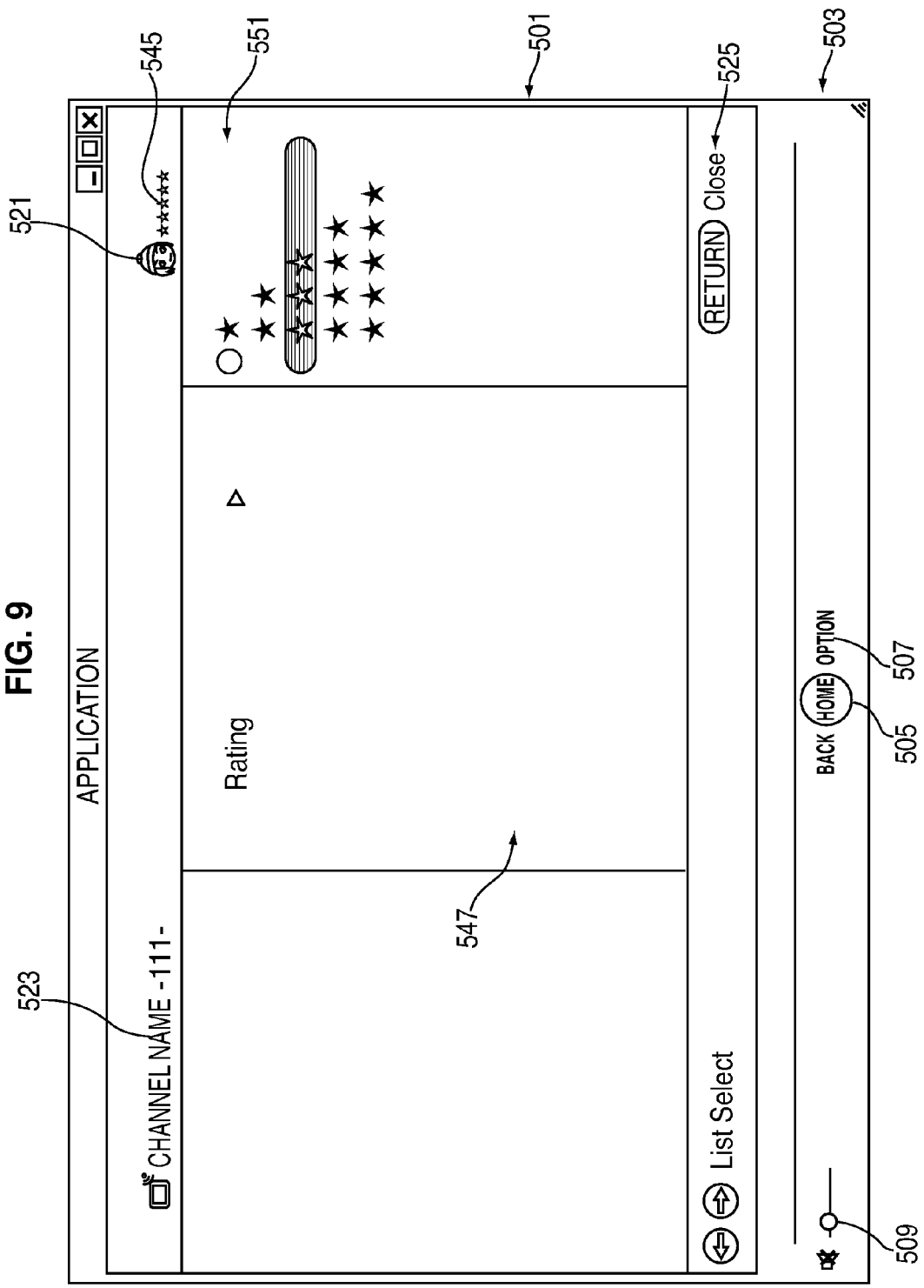
FIG. 9 is an explanatory diagram for explaining the example of the application for use in the information processing unit according to the embodiment.
Figure 10:
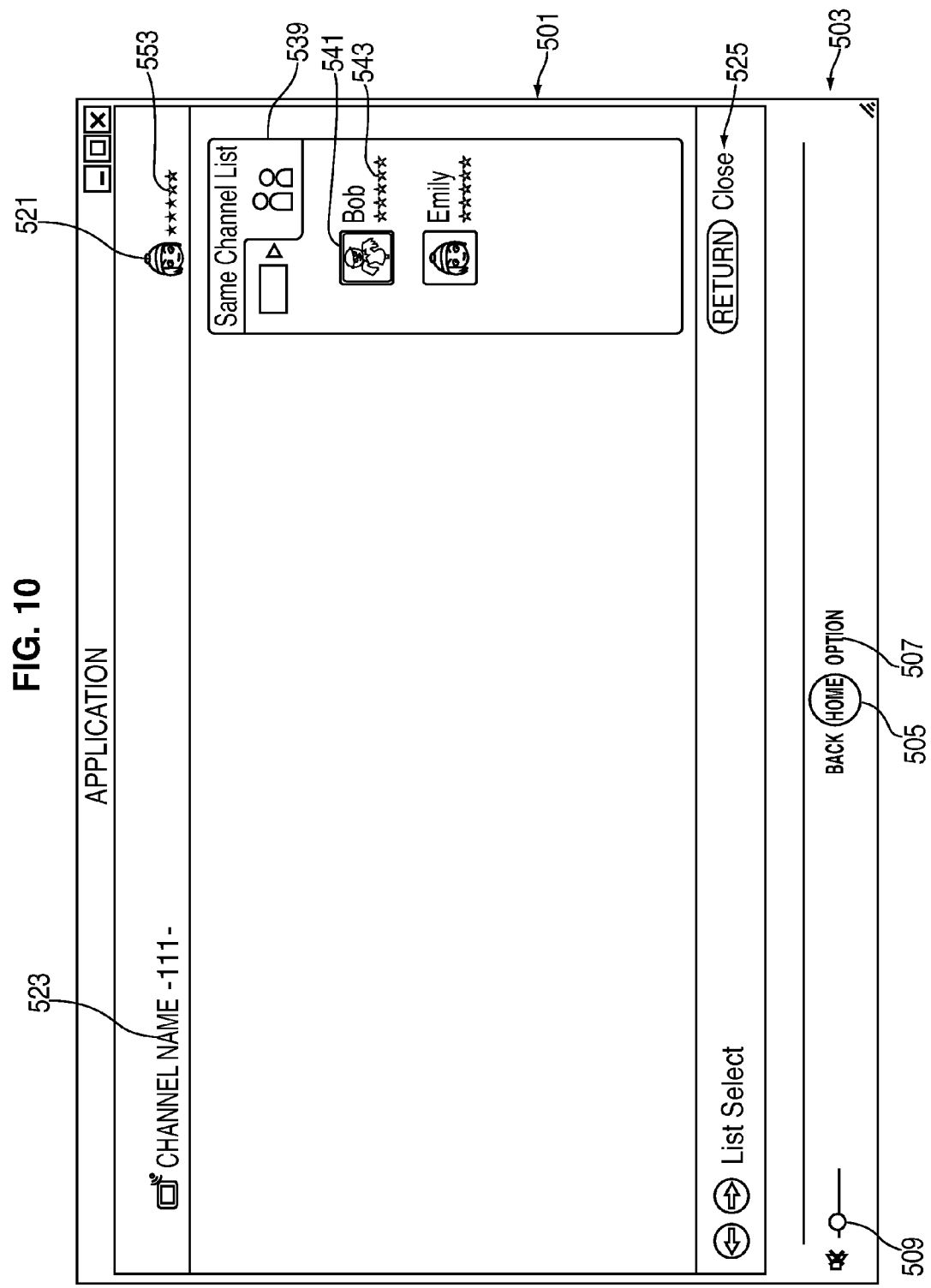
FIG. 10 is an explanatory diagram for explaining the example of the application for use in the information processing unit according to the embodiment.

When the "Rating" icon 549 is selected, an evaluation selecting region 551 is displayed adjacent to the option operation selecting region 547 as shown in FIG. 9. By selecting an evaluation content displayed in the evaluation selecting region 551, the content being watched or listened can be evaluated. When the evaluation content is selected, the evaluation 553 adjacent to the icon (avatar) 521 expressing user is changed as shown in FIG. 10.

Figure 11:
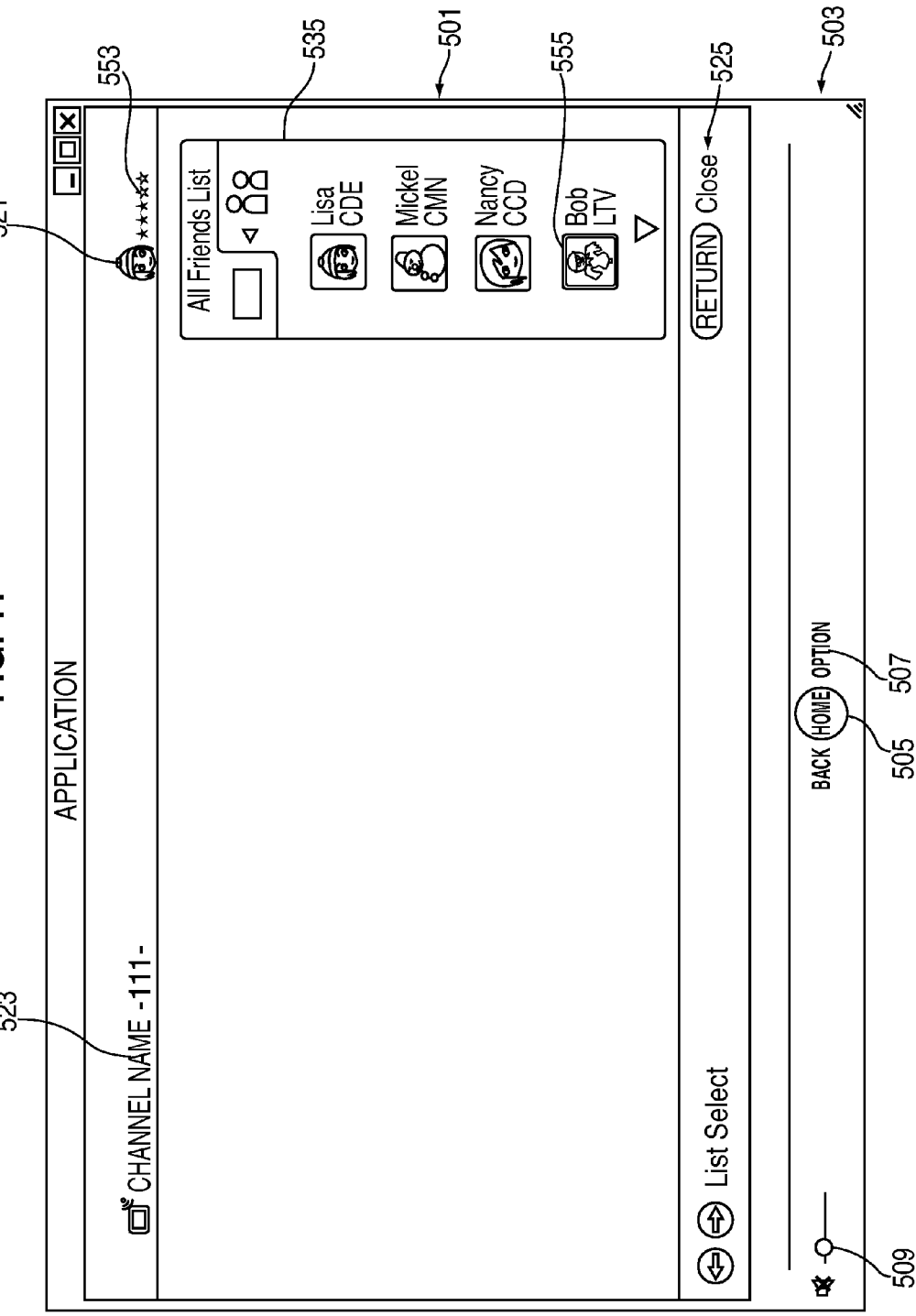
FIG. 11 is an explanatory diagram for explaining the example of the application for use in the information processing unit according to the embodiment.
Figure 12:
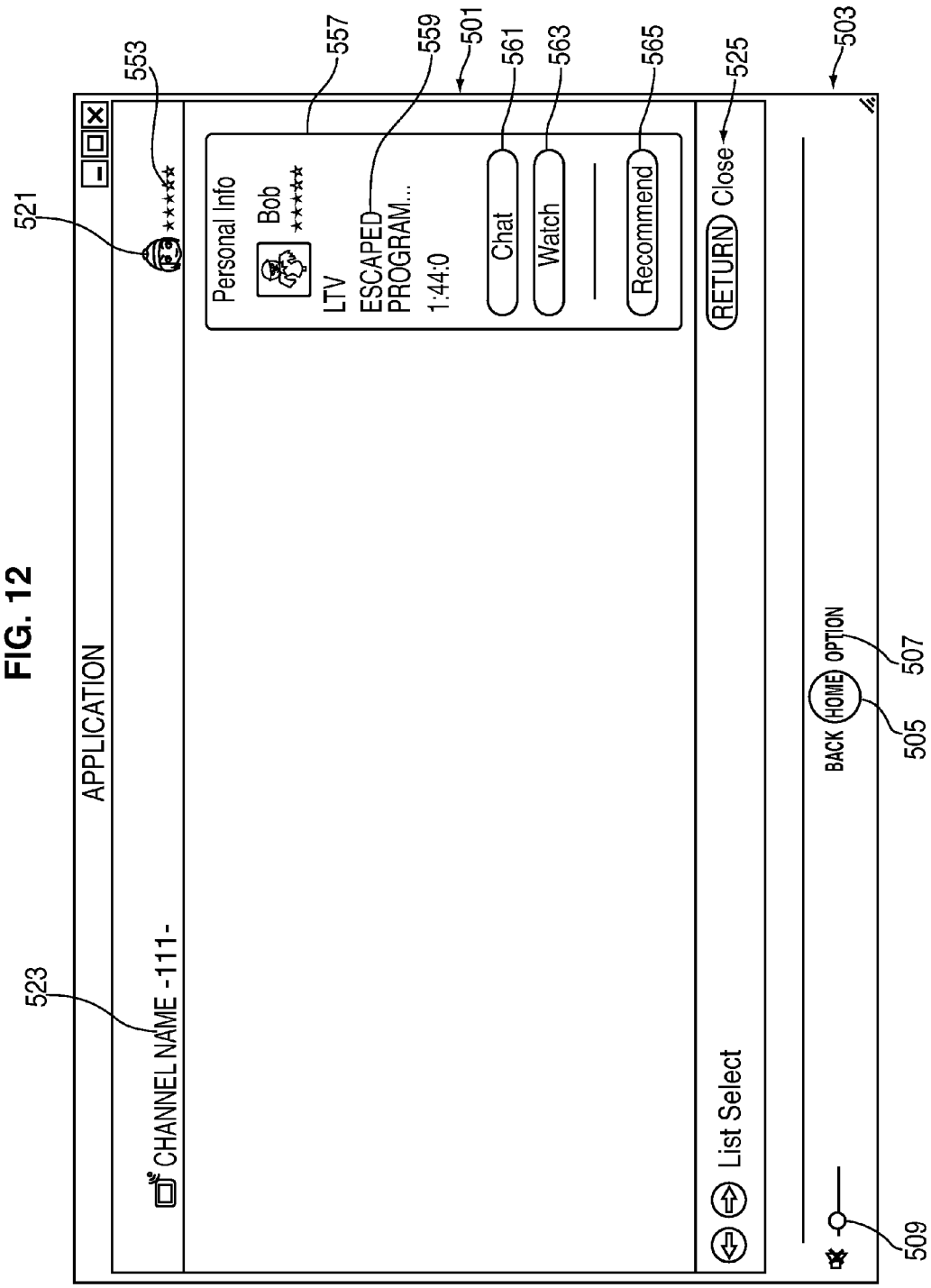
FIG. 12 is an explanatory diagram for explaining the example of the application for use in the information processing unit according to the embodiment.

In the application according to this embodiment, detailed information about users can be referred using the other client devices 14. If an object (avatar) 555 expressing user indicated in the registered ID connecting state display region 535 (for example, "All Friends List") or the same content viewer display region 539 (for example, "Same Channel List") is selected as shown in FIG. 11, a user information display region 557 is displayed in the information display region 501 as shown in FIG. 12. Information 559 about a content which user watches or listens to currently is displayed in this user information display region 557 as well as the object expressing the user. In the user information display region 557, an object 561 ('Chat' icon) for executing bidirectional communication such as chat with user whose information is expressed and an object ("Watch" icon) 563 for watching or listening to a content which the user whose information is expressed watches or listens to are displayed. Further, an object ("Recommend" icon) 565 for recommending the content watched or listened to by user of the information processing unit 200 to the user whose information is expressed is displayed.

Figure 13:
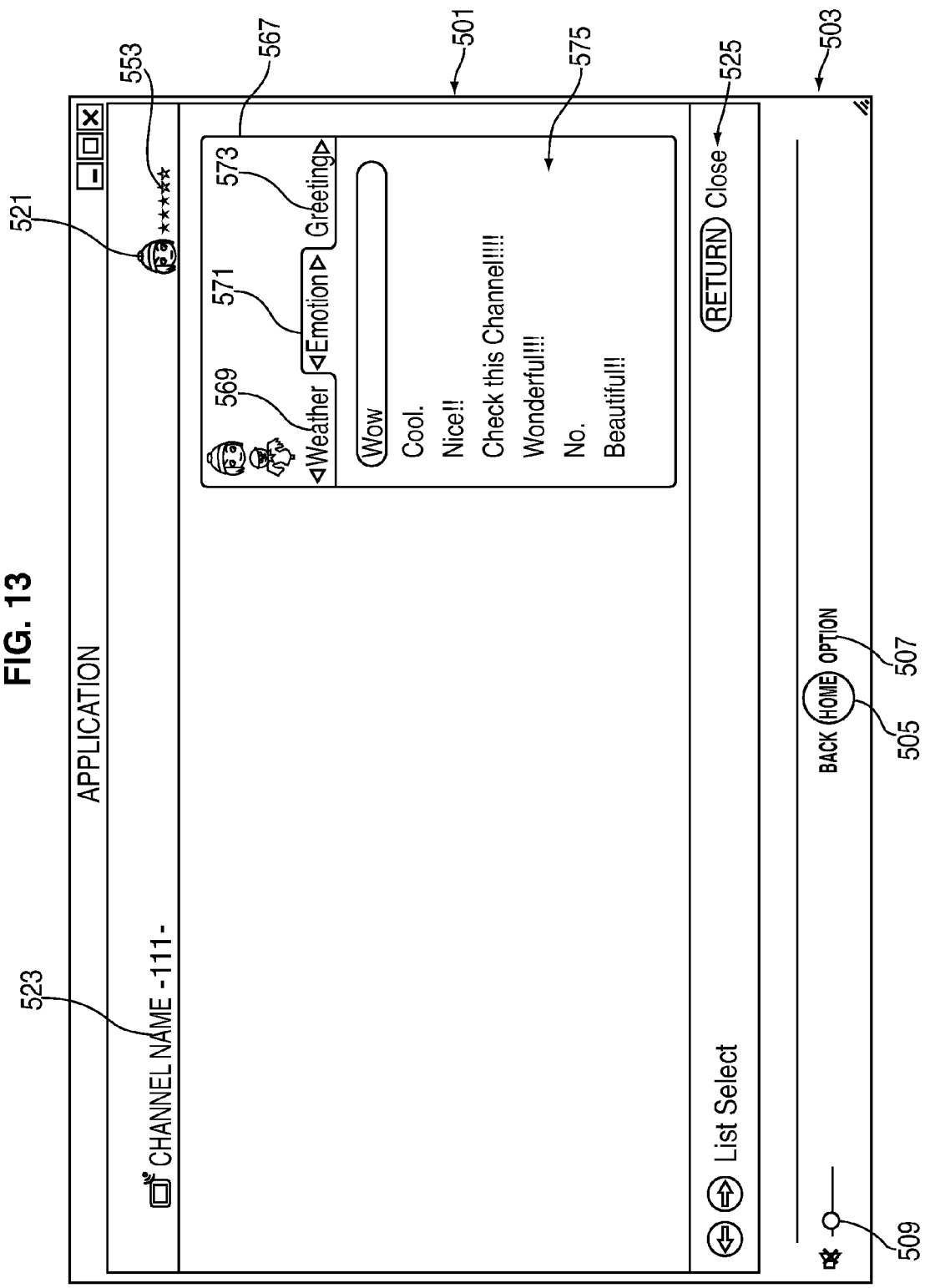
FIG. 13 is an explanatory diagram for explaining the example of the application for use in the information processing unit according to the embodiment.

If user of the information processing unit 200 selects the "Chat" icon 561, a message selecting region 567 is displayed in the information display region 501 instead of the user information display region 557 as shown in FIG. 13. In the message selecting region 567, ordinarily used conversation sentences such as tags which collect sentences about the weather ("Weather" tag) 569, tags ("Emotion" tag) 571 which collect sentences about sentiment, tags ("Greeting" tag) 573 which collect expressions about greeting and the like are set up preliminarily for each topic and by selecting sentences 575 which are accommodated in the tags, the bidirectional communication with a specific user such as chat can be carried out.

Such an application is stored in a read only memory (ROM) or random access memory (RAM) or the like of a memory portion provided on the information processing unit 200 and read into a central processing unit (CPU) provided on the information processing unit 200 and executed. Such an application may be stored in a volatile memory provided in the information processing unit 200 or a volatile memory connected to the information processing unit 200. In the meantime, any recording medium in which the application is recorded and can be read by computer may be provided. As the recording medium, for example, a magnetic disk, optical disk, a magneto-optical disk, a flash memory and the like are available. Further, the aforementioned application may be distributed through a network without using any recording medium.

<Content Providing Server According to this Embodiment>

Figure 14:
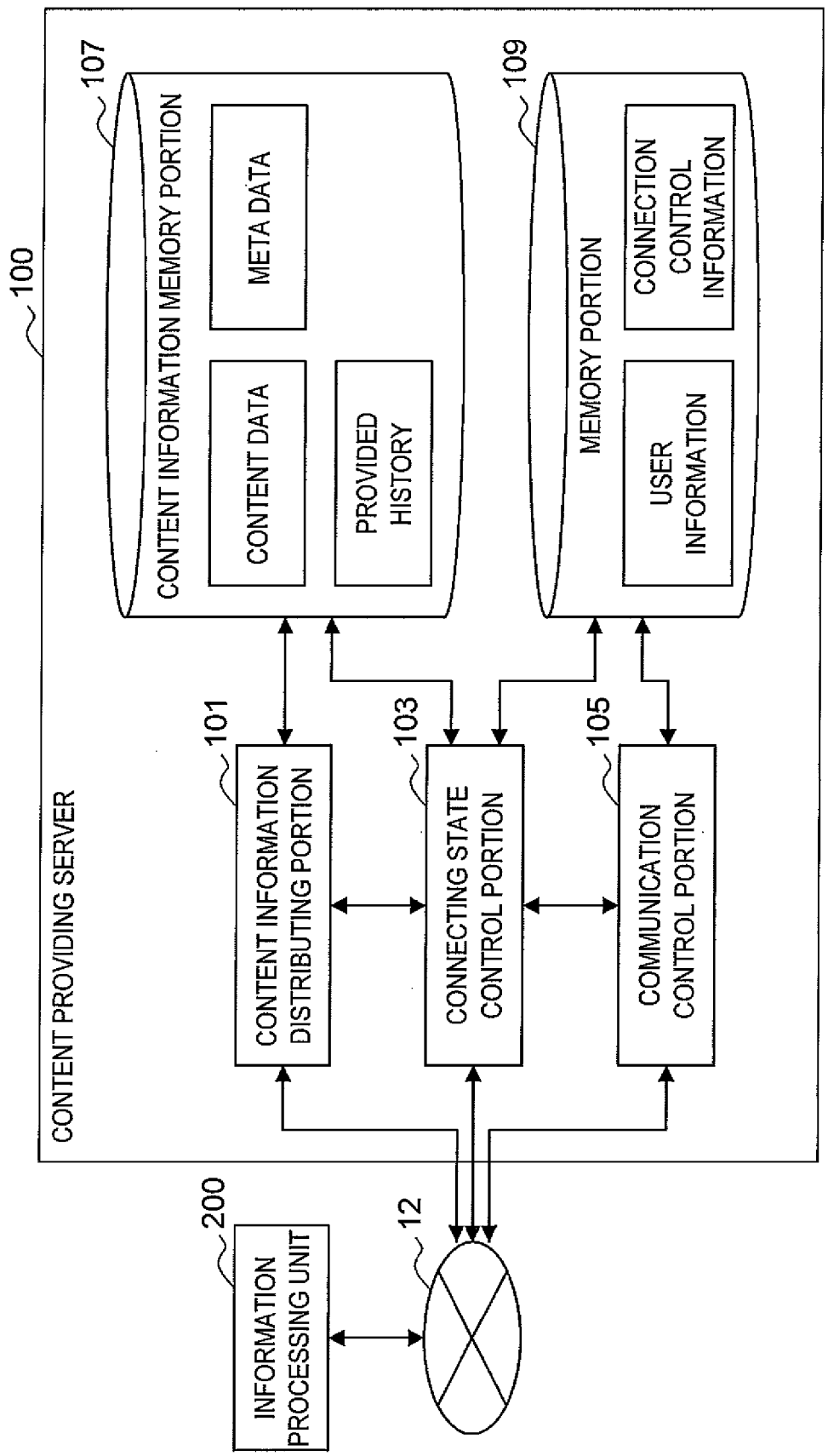
FIG. 14 is a block diagram for explaining functions of the content providing server according to the embodiment.

Next, the content providing server 100 of this embodiment will be described in detail with reference to FIG. 14. FIG. 14 is a block diagram for explaining the function of the content providing server 100 according to this embodiment.

As shown in FIG. 14, the content providing server 100 according to this embodiment includes mainly a content information distribution portion 101, a connecting state control portion 103, a communication control portion 105, a content information memory portion 107, and a memory portion 109.

The content information distribution portion 101 is constituted of, for example, CPU, ROM, RAM, and communication unit and distributes content information such as content data recorded in the content information memory portion 107 and meta data containing a thumbnail of the content corresponding to content data and information about presence/absence of a preview of the content to the information processing unit 200, corresponding to a request from the information processing unit 200. Further, the content information distribution portion 101 may acquire content data from out of the content providing server 100 and distribute the acquired content data to the information processing unit 200. The content information distribution portion 101 may distribute only the meta data to the information processing unit 200 or both the meta data and the content data to the information processing unit 200. In the meantime, the detail of the meta data which the content information distribution portion 101 distributes to the information processing unit 200 will be described in detail below.

The content data mentioned here contains content data relating to the core of a content and content data relating to a preview (hereinafter referred to as trailer) of the content. The content information distribution portion 101 can distribute only the content data relating to the core or only the content data relating to the preview. Further, both the content data relating to the preview and the content data relating to the core can be distributed at the same time. Only the content data relating to the core, containing no content data relating to the preview may exist.

The meta data of a content contains information relating to the thumbnail of a content and information indicating presence/absence of the preview of the content and further, attribute information relating to the content of a content and location information indicating the location of the content. As the location information indicating the location of the content, for example, ID for controlling the content, uniform resource identifier (URI) of the content and the like are available.

The thumbnail of a content is a still picture expressing the tile of the content and the content thereof and used for user of the information processing unit 200 to specify the content.

The content information distribution portion 101 may send the content information about the content data and meta data based on information, transmitted from the connecting state control portion 103 described later, about the information processing unit 200 and the client devices 14 connected to the content providing server 100.

The content information distribution portion 101 may record the history of providing the content to the information processing unit 200 and the client device 14 in the content information memory portion 107 described later, based on a distribution result of the content and information expressing a connecting state transmitted from the connecting state control portion 103. As for the content providing history, the providing history of each of the specified information processing unit 200 and the client device 14 may be recorded in correlation with a providing date and statistical data such as a total number of contents provided by the content providing server 100 and a number of contents provided in each time may be recorded.

The connecting state control portion 103 is constituted of, for example, CPU, ROM, RAM, communication unit and the like so as to control the kind, quantity and address of the information processing unit 200 connected to the content providing server 100 and the client devices 14. The connecting state control portion 103 may record connection control information relating to the connected information processing unit 200 or the like in the memory portion 109 described later or a buffer (not shown) as a database described later. Further, the connecting state control portion 103 may transmit connection control information relating to the other information processing unit 200 connected to the content providing server 100 and the client devices 14.

The communication control portion 105 is constituted of for example, CPU, ROM, RAM, communication unit and the like, so as to control bidirectional communication such as chat between the information processing unit 200 connected to the content providing server 100 and the client device 14. The communication control portion 105 controls such bidirectional communication based on user information and connection information recorded, for example, in the memory portion 109.

For example, content data relating to a content controlled by the content providing server 100, meta data containing information indicating presence/absence of a thumbnail of the content corresponding to the content data and a preview of the content, and content provision history are recorded in the content information memory portion 107. The content information memory portion 107 can appropriately memorize various parameters and a process of processing, which are required to be stored when some processing relating to distribution of the content information is carried out. The content information distribution portion 101 and the connecting state control portion 103 can make reading/writing freely to the content information memory portion 107.

User information and connection control information about the information processing unit 200 and client devices 14 connected to the content providing server 100 are recorded in the memory portion 109. Further, various parameters and database which the communication control portions 105 uses for controlling the bidirectional communication such as chat may be recorded in the memory portion 109 as well as these user information and connection control information. Further, various parameters and a process of the processing, which are required to be stored when some processing is carried out, may be memorized appropriately in addition to the above-mentioned information. The content information distribution portion 101, the connection state control portion 103, and the communication control portion 105 can make reading and writing freely to the memory portion 109.

An example of the function of the content providing server 100 according to this embodiment has been described above. Each component may be constructed using a general purpose member and circuit or of a hardware specified for each of the components. Further, the function of each component may be carried out by CPU or the like. Therefore, the construction for use may be changed appropriately corresponding to each technical level which implements this embodiment.

<Example of Meta Data>

Subsequently, an example of meta data which the content information distribution portion 101 according to this embodiment sends to the information processing unit 200 will be described in detail with reference to FIG. 15. FIG. 15 is an explanatory diagram for explaining an example of meta data which the content information distribution portion 101 according to this embodiment sends.

As shown in FIG. 15, the meta data which the content information distribution portion 101 according to this embodiment sends to the information processing unit 200, includes a title 601 of the content of the content, description 603 which is a brief explanation of the content, rating 605 which describes the level of R-rating, evaluation 607 on the content, episode number 609 of the content, indicating, for example, which episode the content belongs to, content time 611, content category 613, thumbnail URL 615 which is location information of the thumbnail and information 617 indicating presence/absence of a trailer.

The evaluation 607 on the content may be expressed by the number of stars as shown in FIG. 15, for example, or by parameters corresponding to the evaluation, that is, "good", "normal", "bad" or a mark point of the evaluation. In the category 613 of the content, as shown in FIG. 15, for example, the category itself may be described or parameter or the like corresponding to the category may be described. As for the information 617 about presence/absence of the trailer (preview), as shown in FIG. 15, the presence thereof may be matched with "1" and the absence may be matched with "0" or a blank may be provided for the absence.

The information processing unit 200 according to this embodiment described later can provide various information to user of the information processing unit 200 by using such meta data.

<Example of Connection Control Information>

Connection control information relating to the connecting state of an information processing unit generated by the connecting state control portion 103 according to this embodiment will be described in detail with reference to FIG. 16. FIG. 16 is an explanatory diagram for explaining the connection control information generated by the connecting state control portion 103 according to this embodiment.

The connection control information which the connecting state control portion 103 according to this embodiment generates includes, as shown in FIG. 16, user ID 701, connecting state 703, content watched/listened 705, friend user ID 707, friend user connecting state 709, and content watched/listened by friend user 711. The connection control information is summarized for each user ID 701 as shown in FIG. 16 and the content of that content is updated each time when data corresponding to each item is updated.

The connecting state control portion 103 according to this embodiment provides the connection control information corresponding to user ID of user of the information processing unit 200 to the information processing unit 200 connected to the content providing server 100. Thus, the information processing unit 200 which receives such connection control information can determine which the friend user is in on-line status or off-line status. Further, if the user is in the on-line status, the content which is watched or listened can be known.

The notation method of each item of the connection control information shown in FIG. 16 is a mere example and the notation method is not limited to this example.

<About Information Processing Unit According to this Embodiment>

Figure 17:
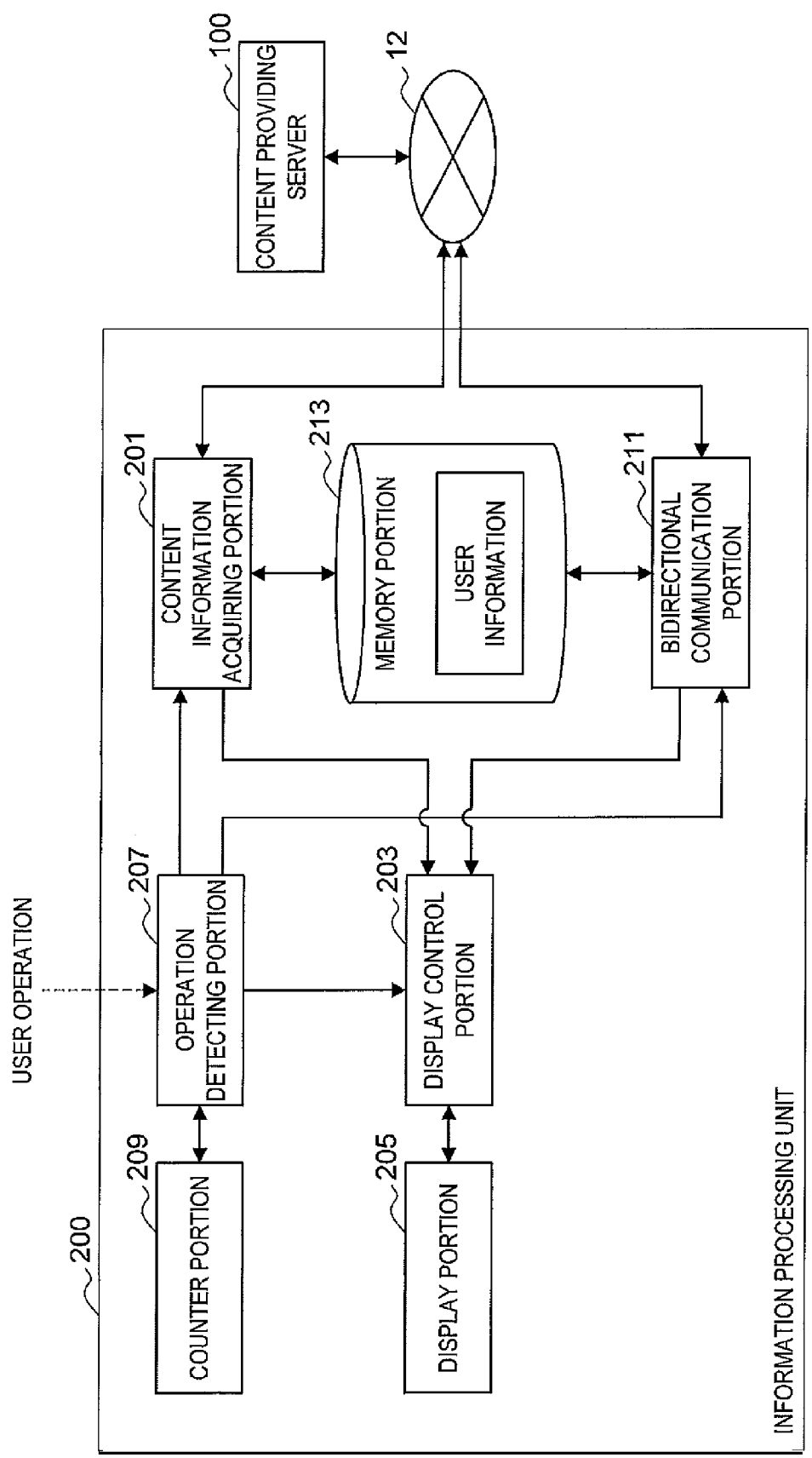
FIG. 17 is a block diagram for explaining a function of the information processing unit according to the embodiment.

Next, the information processing unit 200 according to this embodiment will be described in detail with reference to FIG. 17. FIG. 17 is a block diagram for explaining the function of the information processing unit 200 according to this embodiment.

The information processing unit 200 according to this embodiment mainly includes, as shown in FIG. 17, a content information acquiring portion 201, display control portion 203, display portion 205, operation detecting portion 207, counter portion 209, bidirectional communication portion 211, and memory portion 213.

The content information acquiring portion 201 is constituted of, for example, CPU, ROM, RAM and communication unit so as to acquire content information including the content data and meta data containing a thumbnail of the content corresponding to the content data and information indicating presence/absence of a preview of the content from the content providing server 100. The content data mentioned here contains content data relating to the core of a content and content data relating to a preview (hereinafter referred to as trailer) of the content. The content information acquiring portion 201 outputs the content data relating to the acquired core and the content data relating to the preview of the content data to the display control portion 203 described later. The content information acquiring portion 201 may record the acquired content data and meta data in the memory portion 213 described later.

When the information processing unit 200 is connected to the content providing server 100 through the communication network 12, the content information acquiring portion 201 according to this embodiment sends an acquisition request on the meta data containing the thumbnail of the content and information indicating presence/absence of the preview of the content to the content providing server 100. When the meta data is sent from the content providing server 100 corresponding to an acquisition request, the content information acquiring portion 201 receives the meta data and outputs to the display control portion 203.

If information saying that a position specifying object such as a mouse pointer and cursor stays on a thumbnail in a predetermined time interval is inputted from the operation detecting portion 207 described later, the content information acquiring portion 201 acquires content data about a preview of a content corresponding to the thumbnail from the content providing server 100 based on the acquired meta data and outputs to the display control portion 203. Further, if information saying that the position specifying object has selected a thumbnail is inputted from the operation detecting portion 207, the content information acquiring portion 201 acquires the content data of the core of a content corresponding to the selected thumbnail and outputs to the display control portion 203.

The display control portion 203 is constituted of, for example, CPU, ROM, RAM and the like, so as to control the display of the display portion 205 described later. Content data and meta data are inputted from the content information acquiring portion 201 to the display control portion 203 and the display control portion 203 executes display control so as to display the inputted content data and meta data on the display portion 205. If an operation of a position specifying object such as a mouse pointer and cursor is detected by the operation detecting portion 207, the display control of the position specifying object is carried out corresponding to the detected operation. Further, if the information processing unit 200 is executing the bidirectional communication such as chat with the client device 14, its communication result is inputted from the bidirectional communication portion 211 so as to control the display of the inputted communication result on the display portion 205.

The display portion 205 is an output device having the information processing unit 200 according to this embodiment and for example, such a display unit as a CRT display unit, liquid crystal display unit, plasma display unit, EL display unit is used. Various pieces of displayed information displayed on the display portion 205 are controlled by the display control portion 203.

The operation detecting portion 207 is constituted of, for example, CPU, ROM, RAM and the like so as to detect an operation of the position specifying object such as the mouse pointer and cursor. The detection for the operation of the position specifying object mentioned here includes detection about presence or absence of an operation, that is, which the position specifying object is moving or staying, detection of specifying a current position of the position specifying object and detection about the direction and size of the operation, that is, in what direction and how long the position specifying object has been moved. The operation detecting portion 207 can execute the above-mentioned processing by detecting the operation of the input device such as the mouse and cursor key for operating the position specifying object.

The operation detecting portion 207 transmits operation information about the detected operation of the position specifying object to the content information acquiring portion 201, display control portion 203 and bidirectional communication portion 211.

If the operation detecting portion 207 detects that the position specifying object stays, it calculates a position where the position specifying object stays. If it is calculated that the position specifying object stays on a thumbnail in the display portion 205, the operation detecting portion 207 requests the counter portion 209 described later to start a count-up operation. If a count result of the counter portion 209 reaches a predetermined value and a notification that a predetermined time has elapsed is inputted to the operation detecting portion 207, the operation detecting portion 207 notifies the content information acquiring portion 201 that the position specifying object stays on the thumbnail in a predetermined time interval.

The counter portion 209 has a count-up function of increasing the count equally every predetermined time interval and takes a role for detecting a time passage. The counter portion 209 starts the count-up processing corresponding to the count-up start instruction outputted from the operation detecting portion 207. The counter portion 209 may be constituted in the form of software using CPU, ROM, RAM and the like or in the form of hardware using a logic circuit or the like. A counter value of the counter portion 209 is outputted to the operation detecting portion 207.

The bidirectional communication portion 211 is constituted of, for example, CPU, ROM, RAM and communication unit so as to control bidirectional communication such as chat implemented between the information processing unit 200 according to this embodiment and the other client device 14 connected to the content providing server 100 through the communication network 12, while the content is reproduced at the display portion 205. More specifically, the bidirectional communication portion 211 controls the bidirectional communication with the other client device 14 implemented through the content providing server 100 based on user information and communication protocol recorded in the memory portion 213.

User information about user of the information processing unit 200 is recorded in the memory portion 213. As well as the user information, various parameters, communication protocol and database for the bidirectional communication portion 211 to use for controlling the bidirectional communication such as chat may be recorded in the memory portion 213. In addition to these pieces of information, various parameters which are required to be stored when the information processing unit 200 performs some processing and a process of the processing can be memorized appropriately. The content information acquiring portion 201, display control portion 203, display portion 205, operation detecting portion 207, counter portion 209 and bidirectional communication portion 211 can make reading/writing freely to this memory portion 213.

The memory portion 213 records the applications described with reference to FIG. 2-FIG. 13 and various processings of the information processing unit 200 may be performed based on this application.

An example of the function of the information processing unit 200 according to this embodiment has been shown above. Each component may be constructed using a general purpose member and circuit or of a hardware specified for each of the components. Further, the function of each component may be carried out by CPU or the like. Therefore, the construction for use may be changed appropriately corresponding to each technical level which implements this embodiment.

<About Content Selection Screen of Information Processing Unit According to this Embodiment>

Figure 18:
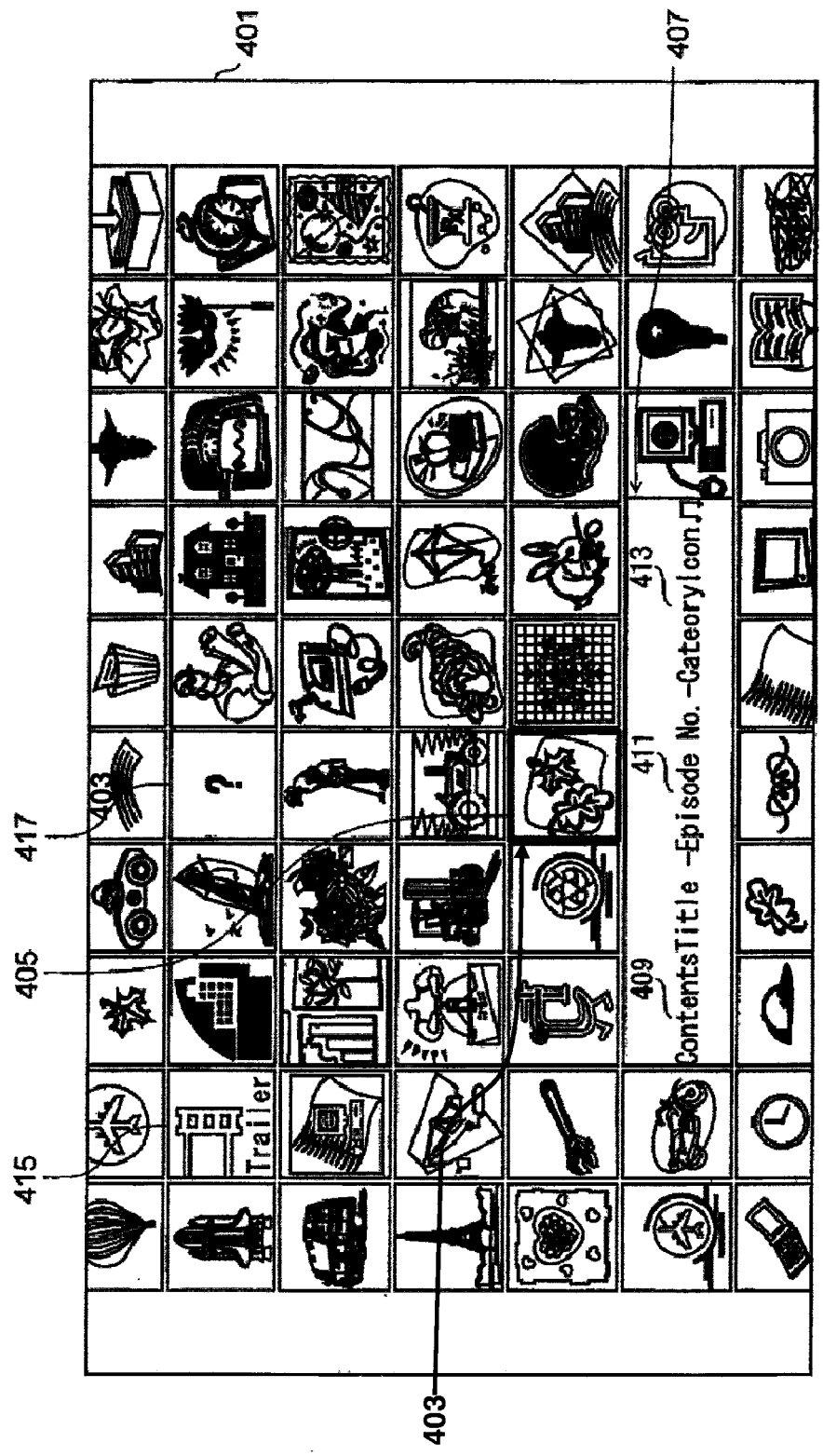
FIG. 18 is an explanatory diagram for explaining a content selection screen of the information processing unit according to the embodiment.
Figure 19:
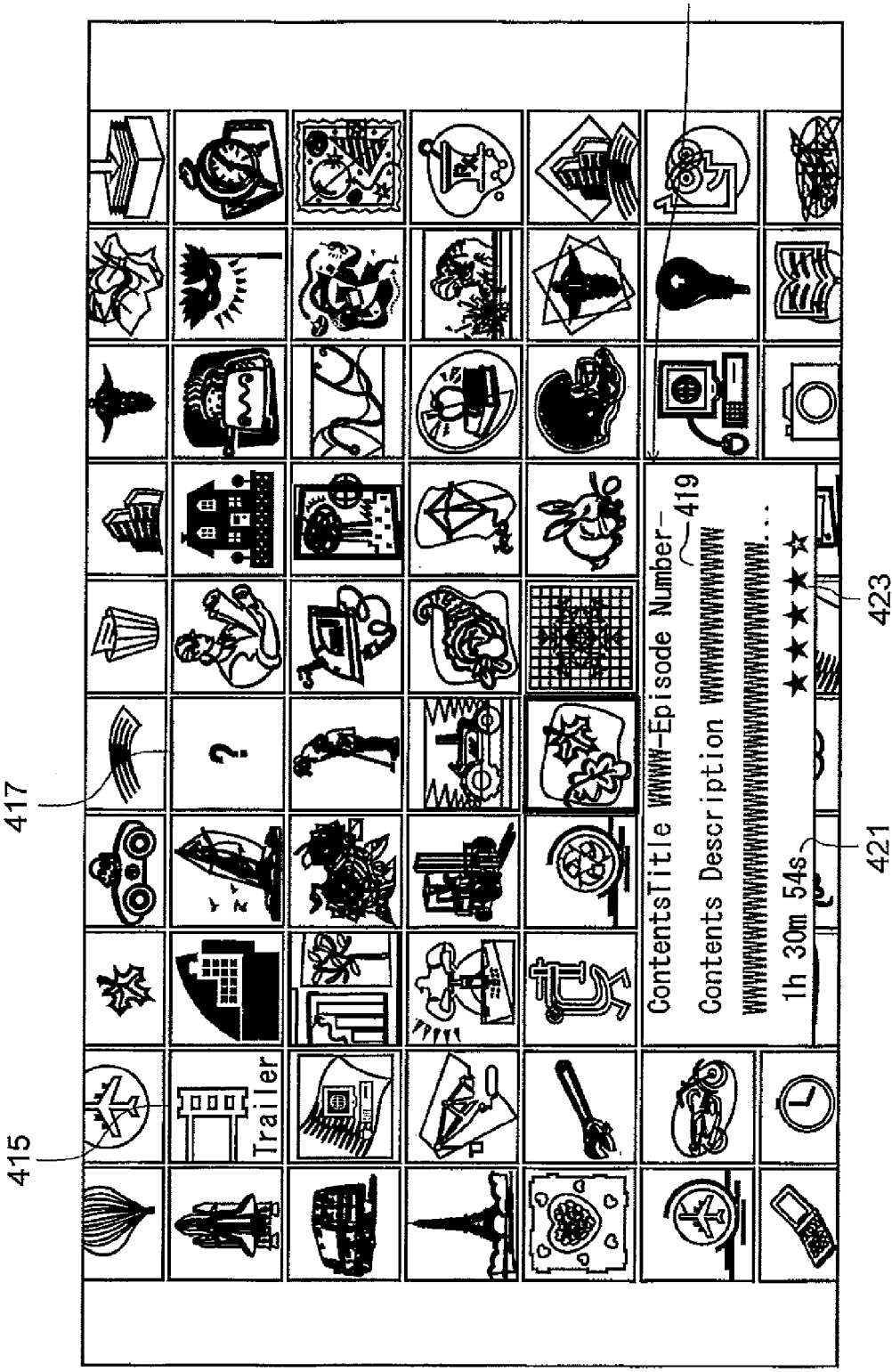
FIG. 19 is an explanatory diagram for explaining a content selection screen of the information processing unit according to the embodiment.

The content selection screen of the information processing unit 200 according to this embodiment will be described in detail with reference to FIG. 18 and FIG. 19. FIG. 18 and FIG. 19 are explanatory diagrams for explaining the content selection screen of the information processing unit according to this embodiment.

The content information acquiring portion 201 of the information processing unit 200 according to this embodiment acquires the meta data from the content providing server 100 and acquires a thumbnail of the content by referring to the URL of the thumbnail described in the acquired meta data. The display control portion 203 displays the acquired thumbnail on the display portion 205 as shown in FIG. 18 for example. User of the information processing unit 200 selects a content to be watched or listened by referring to the display screen of the thumbnail shown in FIG. 18.

On the content selection screen according to this embodiment, as shown in FIG. 18, thumbnails of the contents which can be watched or listened by the information processing unit 200 are arranged horizontally and vertically in the thumbnail display region 401 of the display portion 201. In FIG. 18, the thumbnails are arranged in 10 columns×7 rows and the quantity of the thumbnails displayed on a column and the quantity of rows displayed on a screen are determined depending on the size of the display region of the display portion 205. Further, as shown in FIG. 18, the thumbnails on the uppermost row may be displayed such that their tops fade out. Likewise, the thumbnails on the lowermost row may be displayed such that their bottoms fade out.

If a thumbnail 403 is selected by the cursor 405 on the content selection screen according to this embodiment, a meta data display region 407 in which the meta data of a content corresponding to the selected thumbnail 403 is displayed is generated in the thumbnail display region 401 by the display control portion 203 such that the meta data display region does not overlap the selected thumbnail.

At least a title (Content Title) 409 of a content corresponding to the thumbnail, an episode number (Episode No.) 411 indicating which episode the content belongs to, content genre (Category Icon) 413 are displayed in this meta data display region 407. User of the information processing unit 200 can summarize information about the content effectively by referring to both the thumbnail 403 of the content and the meta data display region 407.

On the content selection screen according to this embodiment, if the cursor 405 is kept selecting a certain thumbnail 403 in a predetermined time interval (for example, several seconds to several tens seconds) (the thumbnail 403 is kept focused by the cursor 405), the content information acquiring portion 201 determines whether or not the thumbnail 403 where the cursor 405 stays has a preview (trailer) by referring to the meta data acquired form the content providing server 100. If the preview exists, the content information acquiring portion 201 acquires the content data relating to the preview from the content providing server 100 and transmits to the display control portion 203. The display control portion 203 automatically reproduces the preview of the content in the size of a region in which the thumbnail is displayed, instead of the thumbnail 403. Further, if the cursor 405 stays after the preview is ended, the preview may be loop reproducing.

Unless the preview exists in the thumbnail 403 where the cursor 405 stays, the display control portion 203 continues to display the thumbnail 403, which is a still picture. As for the thumbnail kept not selected because the cursor 405 is moved after the preview is reproduced, the display control portion 203 may keep the preview 415 reproduced or stop the reproducing of the preview 415 so as to redisplay the thumbnail 403. As for a content whose thumbnail does not exist, a predetermined object 417 may be displayed instead of the thumbnail 403.

If user of the information processing unit 200 selects a certain thumbnail 403 and further watching or listening of the selected thumbnail 403 is determined, the content information acquiring portion 201 acquires a content data relating to the core from the content providing server 100 and transmits to the display control portion 203 and the display control portion 203 changes over the content selection screen as shown in FIG. 18 so as to reproduce the acquired content data of the core.

If a content corresponding to a certain thumbnail is determined, before the content data relating to the core is displayed, the information processing unit 200 may displays confirmation messages, for example, "Are you sure to purchase this content?", "Are you sure to watch this content?", "Are you sure to be over 18 years old?", and the like.

On the content selection screen according to this embodiment, as shown in FIG. 19, for a content whose preview (trailer) is being reproduced, content description 419 which describes a content being reproduced, time 421 required for reproducing of the content and evaluation 423 of that content by other viewer may be displayed in the meta data display region 407. Further, statistical data such as a total number of users who watched or listened to that content may be displayed in addition to the matter shown in FIG. 19. Because such a display content is matter described in the meta data which the content information acquiring portion 201 acquires from the content providing server 100, the information processing unit 200 can freely display various pieces of information pieces described in the meta data.

Because the content selection screen according to this embodiment displays a list of, for example, two or more contents which can be watched or listened to in the form of not text data but image (thumbnail), user of the information processing unit 200 can easily grasp a content which can be watched or listened to by only referring to the thumbnail display region 401. When a thumbnail is selected with the position specifying object such as the cursor and mouse pointer, the meta data of a content corresponding to the selected thumbnail is automatically displayed. Thus, information about the content can be summarized effectively. Because the information processing unit 200 automatically acquires and reproduces the preview of a content corresponding to the thumbnail where the position specifying object stays, user of the information processing unit 200 can grasp the content of a content easily by a simple operation.

<About Content Selection Method in Information Processing Unit According to this Embodiment>

Figure 20:
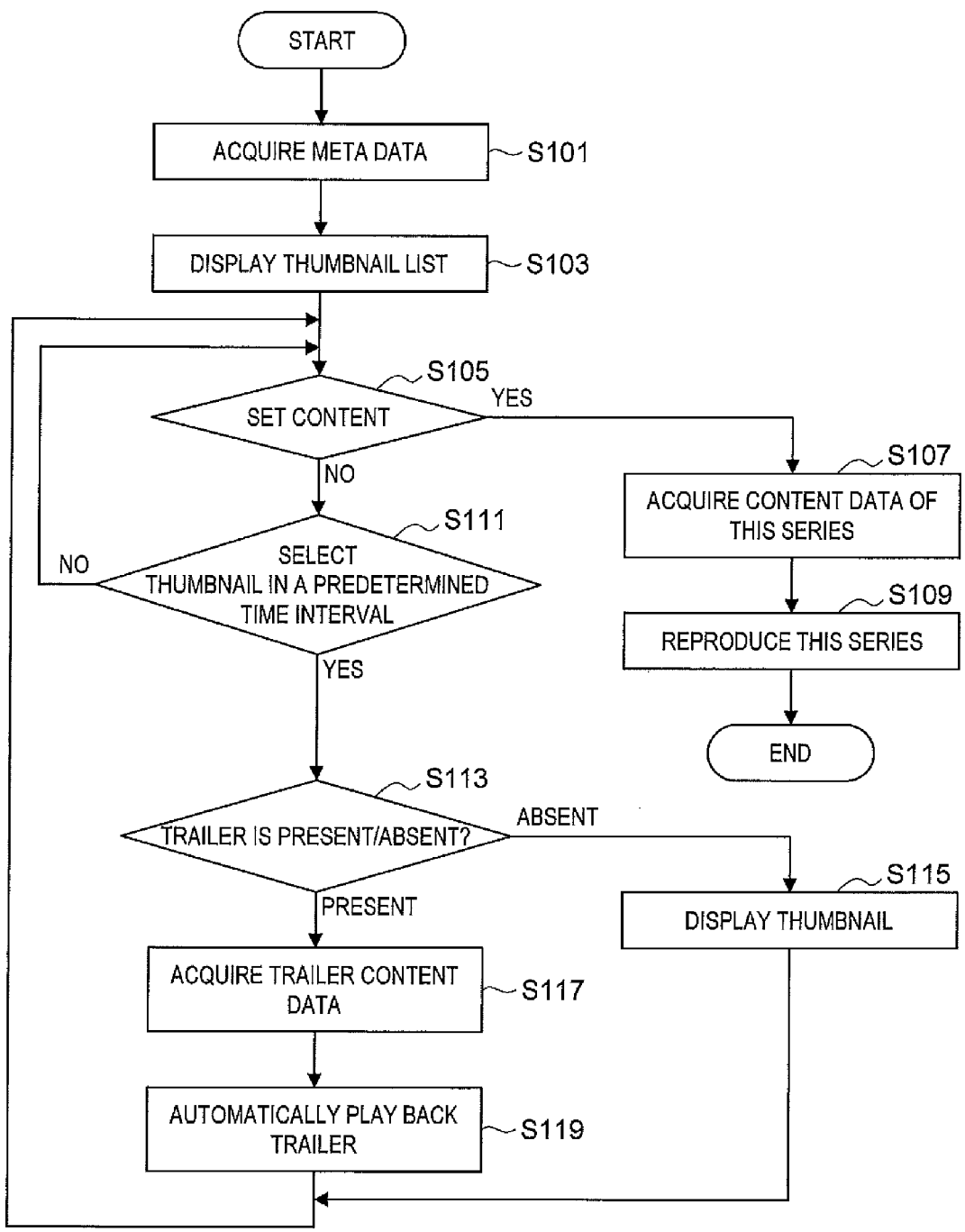
FIG. 20 is a flow chart for explaining a content selection method of the information processing unit according to the embodiment.

Next, the content selection method of the information processing unit 200 according to this embodiment will be described in detail with reference to FIG. 20. FIG. 20 is a flow chart for explaining the content selection method in the information processing unit according to this embodiment.

When the information processing unit 200 according to this embodiment is connected to the content providing server 100 through the communication network 12, the content information acquiring portion 201 transmits a meta data sending request to the content providing server 100 and acquires the meta data from the content providing server 100 (step S101). After acquiring the meta data, the content acquiring portion 201 sends the acquired data to the display control portion 203 and the display control portion 203 displays a list of the thumbnails of contents which can be watched or listened to in the display portion 205 as shown in FIG. 18 for example (step S103).

The operation detecting portion 207 of the information processing unit 200 mostly detects the position and operation of the position specifying object such as the mouse pointer and cursor and determines whether or not user of the information processing unit 200 decided a certain content (step S105). If the operation detecting portion 207 determines that user decided a certain thumbnail, the operation detecting portion transmits this determination result to the content information acquiring portion 201, and the content information acquiring portion 201 acquires the content data relating to the core of the content from the content providing server 100 based on the acquired meta data (step S107). The content data relating to the acquired core is transmitted to the display control portion 203, and the display control portion 203 changes over the content selection screen and reproduces this core (step S109).

Even if user does not decide a certain thumbnail, the operation detecting portion 207 mostly detects the position and operation of the position specifying object and determines whether or not the position specifying object continues to select the certain thumbnail in a predetermined time interval (step S111). Unless the position specifying object continues to select the thumbnail in a predetermined time interval, the information processing unit 200 returns to step S105 and repeats the determination. If the operation detecting portion 207 determines that the position specifying object continues to select the thumbnail in a predetermined time interval, the operation detecting portion transmits this determination result to the content information acquiring portion 201. The content information acquiring portion 201 determines whether or not a preview (trailer) exists in the content corresponding to the selected thumbnail by referring to the acquired meta data (step S113). Unless any preview exists, the information processing unit 200 continues to display the thumbnail without any new processing (step S115) and returns to step S105, in which it repeats the determination.

If the preview exists in a content corresponding to the selected thumbnail, the content information acquiring portion 201 acquires content data relating to the preview of the content from the content providing server 100 by referring to the acquired meta data (step S117). The content data relating to the acquired preview is transmitted to the display control portion 203, and the display control portion 203 automatically reproduces content data relating to the preview acquired instead of the thumbnail in a display region in which the thumbnail is displayed (step S119). After that, the information processing unit 200 returns to step S105, in which it repeats the determination.

The information processing unit 200 according to this embodiment can provide an easy content selection method not limited to an operation method to user of the information processing unit 200 by executing a processing accompanying the content selection as described above and acquire content data interlocked with the operation of user.

<About Hardware Configuration of Content Providing Server and Information Processing Unit>

Figure 21:
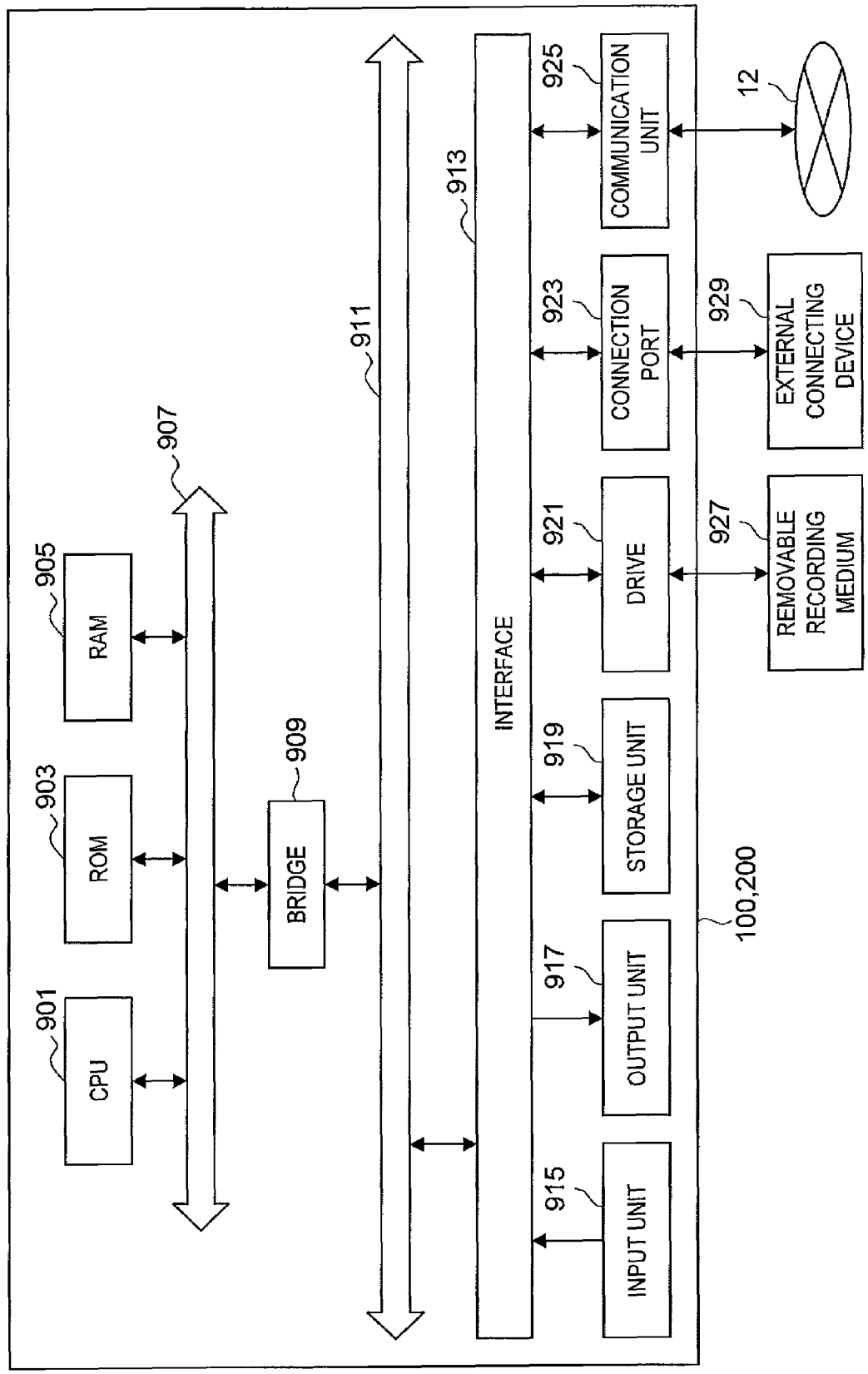
FIG. 21 is a block diagram for explaining a hardware structure of the information processing unit of the content providing server according to the embodiment.

The hardware configuration of the content providing server 100 and information processing unit 200 according to this embodiment will be described in detail with reference to FIG. 21. FIG. 21 is a block diagram for explaining the hardware configuration of the content providing server 100 and the information processing unit 200 according to this embodiment.

The content providing server 100 and the information processing unit 200 mainly include a CPU 901, ROM 903, RAM 905, host bus 907, bridge 909, external bus 911, interface 913, input device 915, output device 917, storage unit 919, drive 921, connecting port 923 and communication unit 925.

The CPU 901 functions as an arithmetic operation processing unit and control unit so as to control the entire operation of the content providing server 100 and the information processing unit 200 or part thereof according to various programs recorded in the ROM 903, RAM 905, storage unit 919 or removable recording medium 927. The ROM 903 memorizes a program and arithmetic operation parameters for use in the CPU 901. The RAM 905 temporarily memorizes a program which the CPU 901 uses for execution thereof and parameters which appropriately change upon the execution. These are connected through a host bus 907 constituted of an internal bus such as the CPU bus.

The host bus 907 is connected to an external bus 911 such as peripheral component interconnect/interface (PCI) through the bridge 909.

The input device 915 is an operation unit which user operates such as a mouse, keyboard, touch panel, button, switch and lever. The input device 915 may be for example, a remote control unit (that is, remote control) using infrared ray or other electric wave or an external connection device 929 such as portable phone and PDA corresponding to operations of the content providing server 100 and information processing unit 200. Further, the input device 915 is constituted of an input control circuit, which generates an input signal based on information inputted by user using the aforementioned operation unit and outputs to the CPU 901. User of the content providing server 100 and information processing unit 200 can instruct the content providing server 100 and the information processing unit 200 to input various kinds of data and perform various processing operations by operating this input device 915.

The output device 917 is constituted of a device capable of notifying user of the acquired information visually or audibly such as display unit including CRT display unit, liquid crystal display unit, plasma display unit, EL display unit, lamp, and audio output device including speaker and head phone, and printer unit, portable phone, facsimile. The output device 917 outputs a result obtained by various processings performed by the content providing server 100 and the information processing unit 200. More specifically, the display unit displays the result obtained by various procesings performed by the content providing server 100 and information processing unit 200 in the form of text or image. On the other hand, the audio output device converts audio signals composed of reproduced sound data and audio data to analog signals and outputs.

The storage device 919 is a data storage device constructed as an example of the memory portion of the content providing server 100 and information processing unit 200 and constituted of, for example, a magnetic memory device such as a hard disk drive (HDD), semiconductor memory device, optical memory device, photomagnetic memory device. This storage device 919 stores programs and various data to be executed by the CPU 901 and audio signal data and image signal data acquired from outside.

The drive 921 is a reader/writer for recording medium and built in or externally installed to the content providing server 100 and information processing unit 200. The drive 921 reads out information recorded in an installed removable recording medium 927 such as a magnetic disk, optical disk, photomagnetic disk, and semiconductor memory and outputs to the RAM 905. The drive 921 can write a record into the installed removable recording medium 927 such as the magnetic disk, optical disk, photomagnetic disk, semiconductor memory. The removable recording medium 927 includes, for example, DVD medium, HD-DVD medium, Blu-ray medium, compact flash (CF)(registered trade mark), memory stick, secure digital memory card (SD memory card) and the like. Further, the removable recording medium 927 may be, for example, an integrated circuit card (IC card) loaded with a non-contact IC chip or an electronic device.

The connection port 923 is a port for directly connecting a device such as universal serial bus (USB) port, IEEE1394 port, for example, i.Link, small computer system interface (SCSI) port, RS-232C port, optical audio terminal, high-definition multimedia interface (HDMI) port to the content providing server 100 and the information processing unit 200. By connecting the external connection device 929 to this connection port 923, the content providing server 100 and the information processing unit 200 can directly acquire audio signal data or image signal data from the external connection device 929 and provide audio signal data and image signal data to the external connection device 929.

The communication device 925 is a communication interface constituted of a communication device for connecting to the communication network 12. The communication device 925 is, for example, wired or wireless local area network (LAN), Bluetooth, communication card for wireless USB (WUSB), optical communication rooter, asymmetric digital subscriber line (ADSL) rooter, or various communication modems. This communication device 925 can exchange audio signal and the like with Internet and other communication device. The communication network 12 is constituted of a network connected with wire or wirelessly, for example, Internet, home LAN, infrared ray communication, radio wave communication and satellite communication may be adopted.

An example of the hardware configuration, which can achieve functions of the content providing server 100 and the information processing unit 200 according to the embodiment of the present invention has been described above. Each component may be constructed using a general purpose member or of a hardware specified for each of the components. Therefore, the hardware configuration for use can be changed appropriately corresponding to the technical level of each time when this embodiment is executed.

It should be understood by those skilled in the art that various modifications, combinations, sub-combinations and alterations may occur depending on design requirements and other factors insofar as they are within the scope of the appended claims or the equivalents thereof.

What is claimed is:

1. An information-processing apparatus for acquiring content data from a content providing server and reproducing the acquired content data, comprising:
    a processor;
    a storage device coupled to the processor;
    a content information-acquiring portion configured to use the processor to:
        receive meta data associated with a plurality of elements of video content from the server, the meta data comprising:
            (i) first information identifying thumbnails associated with corresponding ones of the video content elements, the thumbnails comprising images corresponding to first portions of the video content elements; and
            (ii) second information identifying a preview of at least one of the video content elements, the preview comprising video content constituting a second portion of the at least one video content element;
        obtain data associated with the thumbnails using at least the first information;
    a display control portion configured to use the processor to generate a signal to display the data associated with the thumbnails within a first portion of a display screen; and
    an operation-detecting portion configured to use the processor to detect a motion of a position-specifying object within the first portion of the display screen, the motion being associated with a selection of a first one of the displayed thumbnails by a first user, wherein:
        the operation-detecting portion is further configured to use the processor to:
            calculate, in response to the detected motion, a time period during which the position-specifying object is disposed within the display screen at a position corresponding to the first displayed thumbnail; and
            determine whether the calculated time period is equal to or exceeds a threshold value;
        the content information-acquiring portion is further configured to use the processor to:
            determine, based on at least the second information, whether a preview of the video content element associated with the first displayed thumbnail is available from the server; and
            retrieve data associated with the preview from the server, when the preview is available, and when the calculated time period is equal to or exceeds the threshold value; and
        the display control portion is further configured to use the processor to display the preview data within the first portion of the display screen, the displayed preview data replacing a second one of the displayed thumbnails.

2. The information-processing apparatus of claim 1, wherein display control portion is further configured to use the processor to display the meta data within a second portion of the display screen.

3. The information-processing apparatus of claim 2, wherein the second portion of the display screen does not overlap with the first portion of the display screen.

4. The information-processing apparatus of claim 1, wherein:
    the content information-acquiring portion is further configured to use the processor to receive information associated with a selection of the video content element associated with the first displayed thumbnail by a second user; and
    the display control portion is further configured to use the processor to display the received information within a second portion of the display screen.

5. The information-processing apparatus of claim 4, wherein the information associated with the selection by the second user comprises at least one of information identifying the second user or information identifying a device associated with the second user.

6. The information-processing apparatus of claim 1, wherein:
    the content information-acquiring portion is further configured to use the processor to receive an evaluation of the video content element associated with the first displayed thumbnail from a second user; and
    the display control portion is further configured to use the processor to display at least the evaluation within a second portion of the display screen.

7. The information-processing apparatus of claim 1, wherein the content information-acquiring portion is configured to use the processor to obtain, using the first information, the data associated with the thumbnails from the server.

8. The information-processing apparatus of claim 1, wherein:
- the first information comprises uniform resource locators associated with corresponding ones of the thumbnails; and
- the content information-acquiring portion is configured to use the processor to retrieve the data associated with the thumbnails from one or more external devices associated with corresponding ones of the uniform resource locators.

9. An information-processing method, comprising:
- receiving meta data corresponding to a plurality of elements of video content from an external device, the meta data comprising:
  - (i) first information identifying thumbnails associated with corresponding ones of the video content elements, the thumbnails being images corresponding to first portions of the video content elements; and
  - (ii) second information indicating a presence or absence of a preview of at least one of the video content elements, the preview comprising video content associated with a second portion of the at least one video content element;
- obtaining data associated with the thumbnails using at least the first information;
- generating a signal to display the data associated with the thumbnails within a first portion of a display screen;
- detecting a motion of a position-specifying object within the first portion of the display screen, wherein the motion corresponds to a selection of a first one of the displayed thumbnails by a first user;
- calculating, in response to the detected motion, a time period during which the position-specifying object is disposed within the display screen at a position corresponding to the first displayed thumbnail;
- determining whether the calculated time period is equal to or exceeds a threshold value;
- determining, based on at least the second information, whether the a preview of the video content element associated with the first displayed thumbnail is available from the external device;
- retrieving data associated with the preview from the external device, when the preview is available, and when the calculated time period is equal to or exceeds the threshold value; and
- generating a signal to display the preview data within the first portion of the display screen, the displayed preview data replacing a second one of the displayed thumbnails.

10. The method of claim 9, further comprising generating a signal to display the meta data in a second portion of the display screen.

11. The method of claim 10, wherein the second portion of the display screen does not overlap with the first portion of the display screen.

12. The method of claim 9, further comprising:
- receiving, from the external device, information associated with a selection of the video content element associated with the first displayed thumbnail by a second user; and
- generating a signal to display the received information within a second portion of the display screen.

13. The method of claim 12, wherein the information associated with the selection by the second user comprises at least one of information identifying the second user or information identifying a device associated with the second user.

14. The method of claim 9, further comprising:
- receiving information associated with an evaluation of the video content element associated with the first displayed thumbnail by a second user, and
- displaying the information associated with the evaluation within a second portion of the display screen.

15. The method of claim 9, wherein the obtaining comprises retrieving the data associated with the thumbnails from the server using the first information.

16. The method of claim 9, wherein:
- the first information comprises uniform resource locators associated with corresponding ones of the thumbnails; and
- the obtaining comprises retrieving the data associated with the thumbnails from servers associated with corresponding ones of the uniform resource locators.

* * * * *